United States Patent
Rigo et al.

(10) Patent No.: US 11,318,792 B2
(45) Date of Patent: May 3, 2022

(54) REINFORCED PRODUCT COMPRISING A SELF-ADHESIVE COMPOSITE REINFORCEMENT CONTAINING A BLOCK COPOLYMER

(71) Applicant: COMPAGNIE GENERALE DES ETABLISSEMENTS MICHELIN, Clermont-Ferrand (FR)

(72) Inventors: Sebastien Rigo, Clermont-Ferrand (FR); Quentin Pineau, Evreux (FR)

(73) Assignee: COMPAGNIE GENERALE DES ETABLISSMENT MICHELIN, Clermont-Ferrand (FR)

( * ) Notice: Subject to any disclaimer, the term of this patent is extended or adjusted under 35 U.S.C. 154(b) by 383 days.

(21) Appl. No.: 16/087,300

(22) PCT Filed: Mar. 24, 2017

(86) PCT No.: PCT/EP2017/057117
§ 371 (c)(1),
(2) Date: Sep. 21, 2018

(87) PCT Pub. No.: WO2017/162873
PCT Pub. Date: Sep. 28, 2017

(65) Prior Publication Data
US 2019/0100056 A1  Apr. 4, 2019

(30) Foreign Application Priority Data
Mar. 24, 2016 (FR) ...................................... 1652590

(51) Int. Cl.
*B60C 9/00* (2006.01)
*C08G 81/02* (2006.01)
(Continued)

(52) U.S. Cl.
CPC .......... *B60C 9/0064* (2013.01); *C08G 81/028* (2013.01); *C08J 5/041* (2013.01);
(Continued)

(58) Field of Classification Search
CPC ........ C08K 3/013; C08K 3/08; B60C 9/0064; B60C 9/007; B60C 2009/0014;
(Continued)

(56) References Cited

U.S. PATENT DOCUMENTS 4,018,731 A * 4/1977 Sims ...................... C08G 69/02
525/184
4,754,794 A 7/1988 Bocquet et al.
(Continued)

FOREIGN PATENT DOCUMENTS

EP 0581641 A1 2/1994
EP 0739924 A1 10/1996
(Continued)

OTHER PUBLICATIONS

Derwent English abstract of FR 3026107 A1, published Mar. 2016 (Year: 2016).*
(Continued)

*Primary Examiner* — Jane L Stanley
(74) *Attorney, Agent, or Firm* — Venable LLP

(57) ABSTRACT

A reinforced product, which can be used in particular for the reinforcing of a finished rubber article, comprises one or more textile or metallic reinforcing threads, the said thread or threads being covered individually or collectively with a sheath comprising a sheathing composition comprising one or more block copolymers comprising at least one polyamide block and at least one polyolefin block, the sheathed thread or threads being themselves embedded in a rubber composition.

24 Claims, 2 Drawing Sheets

(51) Int. Cl.
*D07B 1/06* (2006.01)
*C09D 5/08* (2006.01)
*D02G 3/48* (2006.01)
*C08K 3/013* (2018.01)
*C08J 5/04* (2006.01)
*C08K 5/00* (2006.01)
*B60C 1/00* (2006.01)
*B60C 9/20* (2006.01)

(52) U.S. Cl.
CPC ............ *C08K 3/013* (2018.01); *C08K 5/0025* (2013.01); *C09D 5/08* (2013.01); *D02G 3/48* (2013.01); *D07B 1/0666* (2013.01); *B60C 2001/0066* (2013.01); *B60C 2009/0021* (2013.01); *B60C 2009/2019* (2013.01); *B60C 2009/2035* (2013.01); *B60C 2009/2061* (2013.01); *B60C 2009/2096* (2013.01); *D07B 2201/2012* (2013.01); *D07B 2201/2044* (2013.01); *D07B 2201/2046* (2013.01); *D07B 2205/2003* (2013.01); *D07B 2205/3053* (2013.01); *D07B 2207/404* (2013.01)

(58) Field of Classification Search
CPC ...... C08G 69/48; C08G 81/028; C08G 81/02; C08G 2261/126; C08G 2261/75
See application file for complete search history.

(56) References Cited

U.S. PATENT DOCUMENTS

| | | | |
|---|---|---|---|
| 4,857,128 A | 8/1989 | Bocquet et al. | |
| 5,665,855 A | 9/1997 | Acevedo et al. | |
| 5,977,238 A | 11/1999 | Labauze | |
| 6,013,718 A | 1/2000 | Cabioch et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 7,094,854 B2 | 8/2006 | Monteil et al. | |
| 7,217,751 B2 | 5/2007 | Durel et al. | |
| 7,300,970 B2 | 11/2007 | Durel et al. | |
| 7,312,264 B2 | 12/2007 | Gandon-Pain | |
| 7,488,768 B2 | 2/2009 | Tardivat et al. | |
| 7,491,767 B2 | 2/2009 | Durel et al. | |
| 7,820,771 B2 | 10/2010 | Lapra et al. | |
| 8,344,063 B2 | 1/2013 | Marechal et al. | |
| 8,455,584 B2 | 6/2013 | Robert et al. | |
| 8,492,475 B2 | 7/2013 | Araujo Da Silva et al. | |
| 8,973,634 B2 * | 3/2015 | Custodero ............ | D07B 1/0666 152/451 |
| 2001/0036991 A1 | 11/2001 | Robert et al. | |
| 2002/0183436 A1 | 12/2002 | Robert et al. | |
| 2004/0051210 A1 | 3/2004 | Tardivat et al. | |
| 2004/0132880 A1 | 7/2004 | Durel et al. | |
| 2005/0016650 A1 | 1/2005 | Durel et al. | |
| 2005/0016651 A1 | 1/2005 | Durel et al. | |
| 2005/0239639 A1 | 10/2005 | Monteil et al. | |
| 2006/0089445 A1 | 4/2006 | Gandon-Pain | |
| 2008/0026244 A1 | 1/2008 | Barbotin et al. | |
| 2008/0132644 A1 | 6/2008 | Lapra et al. | |
| 2009/0186961 A1 | 7/2009 | Araujo Da Silva et al. | |
| 2009/0234066 A1 | 9/2009 | Araujo Da Silva et al. | |
| 2009/0270558 A1 | 10/2009 | Gandon-Pain et al. | |
| 2010/0168306 A1 | 7/2010 | Barbotin et al. | |
| 2010/0184912 A1 | 7/2010 | Marechal et al. | |
| 2010/0249270 A1 | 9/2010 | Robert et al. | |
| 2010/0252156 A1 | 10/2010 | Robert et al. | |
| 2011/0152458 A1 | 6/2011 | Araujo Da Silva et al. | |
| 2013/0267664 A1 | 10/2013 | Jeol | |
| 2019/0144687 A1 * | 5/2019 | Pineau ................ | C08G 81/028 428/36.91 |

FOREIGN PATENT DOCUMENTS

| | | | |
|---|---|---|---|
| EP | 1127909 A1 | 8/2001 | |
| FR | 2576247 A1 | 7/1986 | |
| FR | 2601293 A1 | 1/1988 | |
| FR | 2740778 A1 | 5/1997 | |
| FR | 2765882 A1 | 1/1999 | |
| FR | 3026107 A1 * | 3/2016 | ............ C08G 81/02 |
| GB | 2262939 A | 7/1993 | |
| WO | 97/36724 A2 | 10/1997 | |
| WO | 99/16600 A1 | 4/1999 | |
| WO | 01/92402 A1 | 12/2001 | |
| WO | 02/30939 A1 | 4/2002 | |
| WO | 02/31041 A1 | 4/2002 | |
| WO | 02/083782 A1 | 10/2002 | |
| WO | 03/002648 A1 | 1/2003 | |
| WO | 03/002649 A1 | 1/2003 | |
| WO | 2004/035639 A1 | 4/2004 | |
| WO | 2004/096865 A1 | 11/2004 | |
| WO | 2005/113666 A1 | 12/2005 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2008/141702 A1 | 11/2008 | |
| WO | 2009/000750 A1 | 12/2008 | |
| WO | 2009/000752 A1 | 12/2008 | |
| WO | 2012/080404 A1 | 6/2012 | |
| WO | WO 2015023380 A1 * | 2/2015 | ............ C08G 69/48 |

OTHER PUBLICATIONS

International Search Report dated May 12, 2017, in corresponding PCT/EP2017/057117 (3 pages).

P. Petrov et al., "Polyamide-6-b-Polybutadiene Block Copolymers: Synthesis and Properties", J. Appl. Polymer Sci., vol. 89, pp. 711-717 (2003).

* cited by examiner

REINFORCED PRODUCT COMPRISING A SELF-ADHESIVE COMPOSITE REINFORCEMENT CONTAINING A BLOCK COPOLYMER

FIELD OF THE INVENTION

The present invention relates to a reinforced product which can be used in particular for the reinforcing of a finished rubber article, comprising one or more reinforcing threads, the said thread or threads being covered with a sheath comprising a sheathing composition comprising one or more specific block copolymers, the sheathed thread or threads (thus forming a composite reinforcer) being themselves embedded in a rubber composition based on at least one diene elastomer.

RELATED ART

The sheathing of metallic reinforcers with thermoplastic materials, such as, for example, polyamide or polyester, has been known for a very long time, in particular in order to protect these reinforcers from various types of external attacks, such as oxidation or abrasion, or else for the purpose of structurally stiffening, rendering integral with one another various assemblies of threads or assemblages of threads, such as cords, and thus increasing in particular their buckling resistance.

Such composite reinforcers, as well as their use in rubber articles, such as pneumatic tyres, have been described in many patent documents.

There is known, for example, from the state of the art, a reinforcer, made of steel or of aramid textile, sheathed by a thermoplastic material, such as polyester or polyamide, for the purpose of improving its abrasion resistance.

Patent Application FR 2 601 293 has described the sheathing of a metallic cord with polyamide in order to use it as bead wire in a pneumatic tyre bead, this sheathing advantageously making it possible to adjust the shape of this bead wire to the structure and to the operating conditions of the bead of the pneumatic tyre which it reinforces.

Patent documents FR 2 576 247 or U.S. Pat. No. 4,754,794 have also described metallic cords or threads which are doubly-sheathed or indeed even triply-sheathed by two or respectively three different thermoplastic materials (e.g. polyamides) having different melting points, for the purpose, on the one hand, of controlling the distance between these threads or cords and, on the other hand, of eliminating the risks of wear by rubbing or of corrosion, in order to use them as bead wire in a pneumatic tyre bead.

These reinforcers thus sheathed with polyester or polyamide material exhibit, apart from the abovementioned advantages of corrosion resistance, abrasion resistance and structural rigidity, the not insignificant advantage of being able to be subsequently adhesively bonded to diene rubber matrices using simple textile adhesives, known as RFL (resorcinol-formaldehyde latex) adhesives, comprising at least one diene elastomer, such as natural rubber, which adhesives in a known way confer a satisfactory adhesion between textile fibres, such as polyester or polyamide fibres, and a diene rubber.

Thus, use may advantageously be made of metallic reinforcers not coated with adhesive metallic layers, such as brass, and also of surrounding rubber matrices devoid of metal salts, such as cobalt salts, which are necessary in a known way for maintaining the adhesive performance qualities over the course of time but which significantly increase, on the one hand, the cost of the rubber matrices themselves and, on the other hand, their sensitivity to oxidation and to ageing (see, for example, Patent Application WO 2005/113666).

However, the above RFL adhesives are not without disadvantages: they comprise in particular, as base substance, formaldehyde, which it is desirable in the long term to eliminate from adhesive compositions due to the recent changes in European regulations regarding this type of product.

Thus, designers of diene rubber articles, in particular pneumatic tyre manufacturers, have at the present time the objective of finding new adhesive systems or new reinforcers for reinforced products which make it possible to overcome all or some of the abovementioned disadvantages.

The Applicant Companies have discovered that block copolymers with a specific structure make it possible to achieve this objective, that is to say make it possible to prepare composite reinforcers capable of directly adhering to rubber.

SUMMARY OF THE INVENTION

A subject-matter of the invention is thus a reinforced product which can be used in particular for the reinforcing of a finished rubber article, comprising one or more reinforcing threads, the said thread or threads being covered individually or collectively with a sheath comprising a sheathing composition comprising one or more block copolymers comprising at least one polyamide block and at least one polyolefin block, the sheathed thread or threads being themselves embedded in a rubber composition.

Another subject-matter of the invention is a tyre comprising such a reinforced product.

BRIEF DESCRIPTION OF DRAWINGS

The invention and its advantages will be easily understood in the light of the description and of the exemplary embodiments which follow, and also of the figures relating to these examples, which diagrammatically show:

in radial section, a pneumatic tyre having a radial carcass reinforcement in accordance with the invention, incorporating a reinforced product according to the invention in its belt or in its carcass (FIG. 1);

Figure 2:
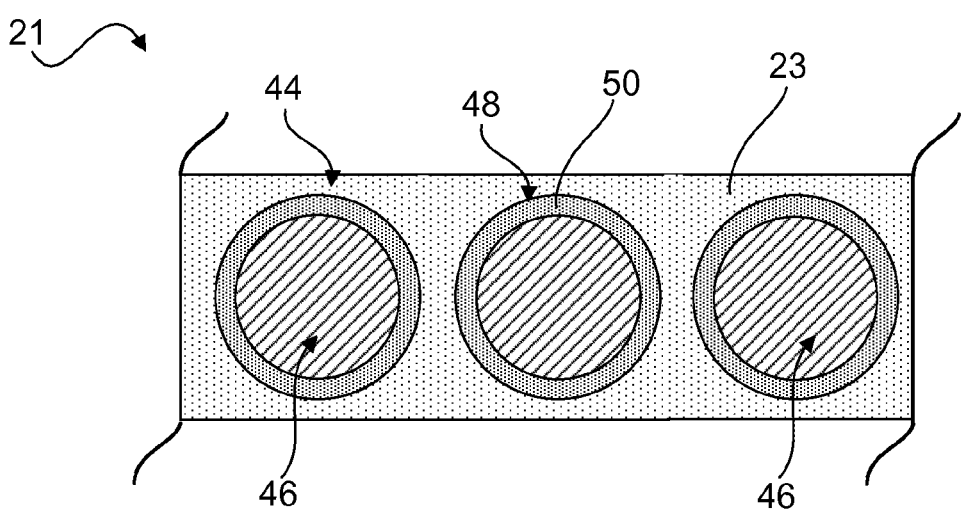
Figure 3:
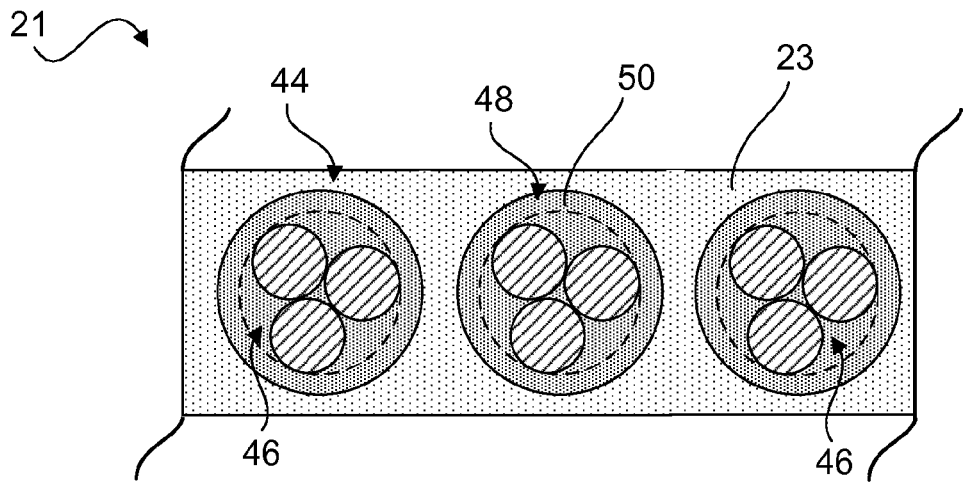
Figure 4:
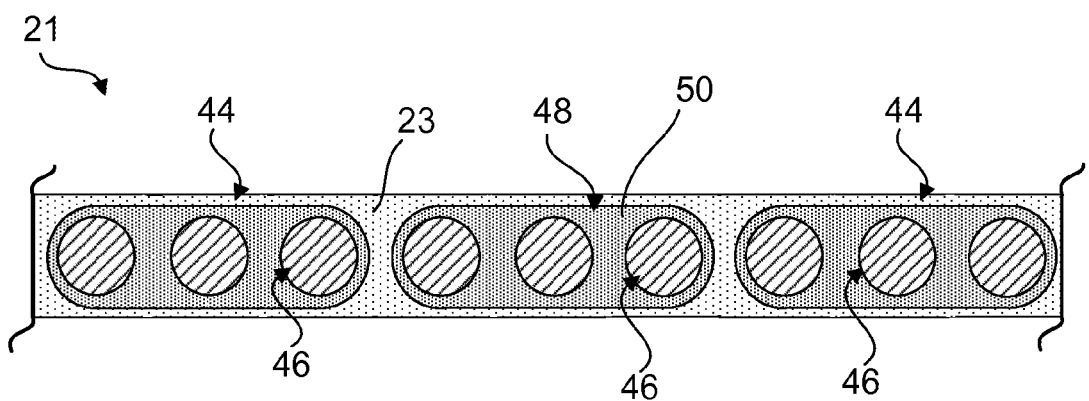
Figure 5:
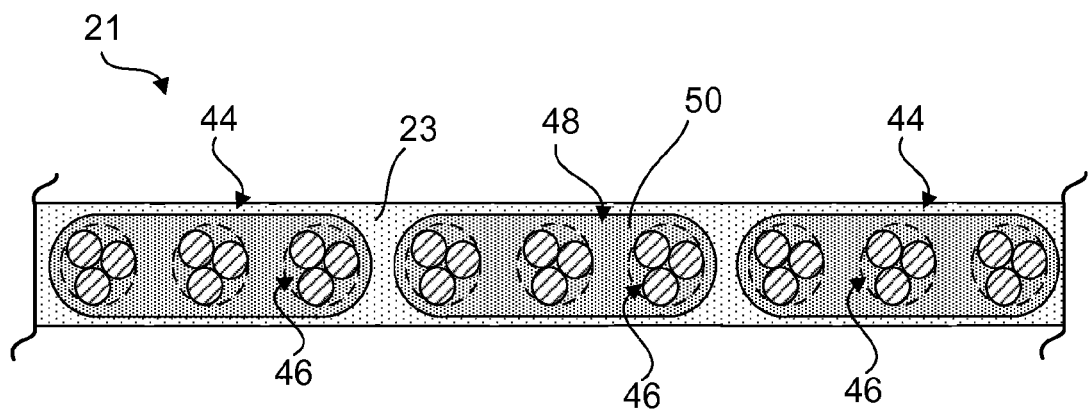

in cross section, an example of a reinforced product according to the invention, comprising 3 threads, each thread comprising a single monofilament and being individually covered with a sheath, which threads are embedded together in a rubber composition (FIG. 2);

in cross section, another example of a reinforced product in accordance with the invention, comprising 3 threads, each thread comprising 3 monofilaments and being individually covered with a sheath, the 3 sheathed threads being embedded in a rubber composition (FIG. 3);

in cross section, another example of a reinforced product in accordance with the invention, comprising a thin strip of 3 threads, each thread comprising a single monofilament, the 3 threads being collectively covered with one and the same sheath and being embedded in a rubber composition (FIG. 4);

in cross section, another example of a reinforced product in accordance with the invention, comprising a strip of 3 threads, each thread comprising 3 monofilaments, the 3 threads being collectively covered with one and the same sheath and being embedded in a rubber composition (FIG. 5).

DETAILED DESCRIPTION OF THE INVENTION

In the present description, unless expressly indicated otherwise, all the percentages (%) shown are % by weight.

The abbreviation "phr" means parts by weight per hundred parts of elastomer or rubber (of the total of the elastomers, if several elastomers are present).

Furthermore, any interval of values denoted by the expression "between a and b" or "of between a and b" represents the range of values extending from a to b (that is to say, limits a and b included); likewise, any interval of values denoted by the expression "from a to b" means the range of values extending from a up to b (that is to say, including the strict limits a and b).

Reinforcing Thread

In the present patent application, the term "reinforcing thread" is generally understood to mean any elongate element of great length relative to its cross section, whatever the shape, for example circular, oblong, rectangular, square, or even flat, of this cross section, it being possible for this thread to be straight or not straight, for example twisted or wavy. When it is circular in shape, its diameter is preferably less than 5 mm, more preferably within a range from 0.1 to 2 mm.

The reinforcing thread may take any known form; it may, for example, be an individual monofilament of large diameter (for example and preferably equal to or greater than 50 µm), an individual ribbon, a film, a multifilament fibre (consisting of a plurality of individual filaments (or monofilaments), which are linear or twisted, of small diameter, typically less than 30 µm), a textile folded yarn formed from several fibres twisted together, a braid formed from several fibres or monofilament braided together, a textile or metallic cord formed from several fibres or monofilaments cabled or twisted together.

In the present patent application, threadlike reinforcer, composite reinforcer, sheathed reinforcer or reinforcing element is generally understood to mean one or more reinforcing threads covered with a sheath.

According to a preferred embodiment, the composite reinforcer of use in producing the reinforced product according to the invention can thus be provided in the form of a single reinforcing thread, covered in its sheath, in order to constitute a sheathed unitary composite thread, embedded in the rubber composition of the invention.

According to another preferred embodiment, the composite reinforcer of use in producing the reinforced product according to the invention can also be provided in the form of several reinforcing threads. In this case, the reinforcing threads (monofilaments, ribbons, films, fibres, folded yarns, braids or cords) can be arranged so as to form a woven fabric or a nonwoven fabric or a knitted fabric. According to a first sub-embodiment, each reinforcing thread is covered with its sheath and then the different sheathed reinforcing threads are arranged together. According to a second sub-embodiment, the reinforcing threads are arranged together and are then collectively covered in their sheath. These reinforcing threads, individually or collectively sheathed, are then embedded in the rubber composition, in order to constitute a reinforced product according to the invention, for example a belt, a strip or a composite woven fabric made of rubber of various forms, such as those usually encountered in the structure of pneumatic tyres. Mention will in particular be made, as preferred examples of reinforced products in accordance with the invention, of the woven fabrics constituting the carcass reinforcement plies, the protective crown plies, the hooping crown plies or the working crown plies present in the belts of tyres.

According to a preferred embodiment, the reinforcing thread is a metallic reinforcing thread comprising at least one metallic monofilament.

By definition, metallic is understood to mean a thread in which each monofilament is composed predominantly (that is to say, for more than 50% of its weight) or entirely (for 100% of its weight) of a metallic material. Each monofilament is preferably made of steel, more preferably made of pearlitic (or ferritic-pearlitic) carbon steel, hereinafter denoted by "carbon steel", or else made of stainless steel (by definition, steel comprising at least 11% of chromium and at least 50% of iron). When a carbon steel is used, its carbon content (% by weight of steel) is preferably between 0.5% and 0.9%. Use is preferably made of a steel of the normal tensile (NT) or high tensile (HT) steel cord type, the tensile strength (Rm) of which is preferably greater than 2000 MPa, more preferably greater than 2500 MPa and less than 3000 MPa (measurement carried out under tension according to Standard ISO 6892 of 1984). The steel may be coated with an adhesive layer, such as brass or zinc.

According to another preferred embodiment, the reinforcing thread is a textile thread consisting of a synthetic or natural polymer material, indeed even of an inorganic material. Mention may in particular be made, by way of example, of reinforcing threads made of polyvinyl alcohol (PVA), aliphatic polyamide (e.g., polyamides 4-6, 6, 6-6, 11 or 12), aromatic polyamide (or "aramid"), polyamide-imide, polyimide, polyester (e.g., PET, PEN), aromatic polyester, polyethylene, polypropylene, polyketone, cellulose, rayon, viscose, polyphenylene benzobisoxazole (PBO), glass, carbon or else ceramic.

As explained above, the reinforcing thread or threads are covered with a sheath.

According to the invention, the sheath comprises a sheathing composition comprising one or more block copolymers.

Block Copolymer

The block copolymer or copolymers present in the sheathing composition of the reinforced product according to the present invention comprise:
- at least one polyamide block,
- at least one polyolefin block.

The structure of these blocks is described below.

The block copolymer of use according to the invention is a thermoplastic copolymer. The block copolymer of use according to the invention is not a rubber. Neither is the block copolymer of use according to the invention a thermosetting copolymer.

Polyamide Block

The block copolymers of use according to the invention comprise, in their structure, at least one polyamide block.

The nomenclature used to define polyamides is described in Standard ISO 1874-1:1992, "Plastics—Polyamide (PA) moulding and extrusion materials—Part 1: Designation", in particular on page 3 (Tables 1 and 2), and is well known to a person skilled in the art.

The polyamide block of the block copolymer of use according to the present invention can have a homopolyamide or copolyamide structure.

Homopolyamide is understood to mean, within the meaning of the present invention, a polyamide which consists only of the repetition of a single unit.

Copolyamide is understood to mean, within the meaning of the present invention, a polyamide which consists of the repetition of at least two units of different chemical structure. This copolyamide can exhibit a random, alternating or block structure.

The polyamide block of the block copolymer of use according to the present invention can comprise one or more structural units chosen from amino acids, lactams and (diamine). (diacid) units.

When the polyamide comprises an amino acid in its structure, it can be chosen from 9-aminononanoic acid (A=9), 10-aminodecanoic acid (A=10), 10-aminoundecanoic (A=11), 12-aminododecanoic acid (A=12) and 11-aminoundecanoic acid (A=11) and also its derivatives, in particular N-heptyl-11-aminoundecanoic acid, A denoting the number of carbon atoms in the unit.

When the polyamide comprises a lactam, it can be chosen from pyrrolidinone, 2-piperidinone, caprolactam, enantholactam, caprylolactam, pelargolactam, decanolactam, undecanolactam and lauryllactam (A=12).

When the polyamide is a unit corresponding to the formula (Ca diamine).(Cb diacid), Ca and Cb denoting the number of carbon atoms respectively in the diamine and the diacid, the (Ca diamine) unit is chosen from linear or branched aliphatic diamines, cycloaliphatic diamines and alkylaromatic diamines.

When the diamine is aliphatic and linear, of formula $H_2N-(CH_2)_a-NH_2$, the (Ca diamine) monomer is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), eicosanediamine (a=20), docosanediamine (a=22) and the diamines obtained from fatty acids.

Mention may also be made, as linear aliphatic diamine, of octadecenediamine.

When the diamine is aliphatic and branched, it can comprise one or more methyl or ethyl substituents on the main chain. For example, the (Ca diamine) monomer can advantageously be chosen from 2,2,4-trimethyl-1,6-hexanediamine, 2,4,4-trimethyl-1,6-hexanediamine, 1,3-diaminopentane, 2-methyl-1,5-pentanediamine or 2-methyl-1,8-octanediamine.

When the (Ca diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis-(3-methyl-4-aminocyclohexyl)methane (BMACM or MACM), bis(p-aminocyclohexyl)methane (PACM) and isopropylidenedi(cyclohexylamine) (PACP), isophoronediamine (a=10), piperazine (a=4) or aminoethylpiperazine. It can also comprise the following carbon backbones: norbornylmethane, cyclohexylmethane, dicyclohexylpropane, di(methylcyclohexyl)propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the (Ca diamine) monomer is alkylaromatic, it is chosen from 1,3-xylylenediamine and 1,4-xylylene diamine.

The (Cb diacid) unit is chosen from linear or branched aliphatic diacids, cycloaliphatic diacids and aromatic diacids.

When the (Cb diacid) monomer is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecanedioic acid (b=18), eicosanedioic acid (b=20), docosanedioic acid (b=22) and the fatty acid dimers containing 36 carbons.

The abovementioned fatty acid dimers are dimerized fatty acids obtained by oligomerization or polymerization of unsaturated monobasic fatty acids comprising a long hydrocarbon chain (such as linoleic acid and oleic acid), as described in particular in the document EP 0 471 566.

When the diacid is cycloaliphatic, it can comprise the following carbon backbones: norbornylmethane, cyclohexylmethane, dicyclohexylmethane, dicyclohexylpropane, di(methylcyclohexyl)propane.

When the diacid is aromatic, it is chosen from terephthalic acid (denoted T), isophthalic acid (denoted I) and naphthalenic diacids.

Preferably, the block polyamide in the block copolymer of use according to the invention is chosen from PA 6, that is to say a polyamide resulting from the polycondensation of caprolactam, PA 11, PA 12, PA 6.10, that is to say a polyamide resulting from the polycondensation of hexanediamine (Ca=6 diamine) and sebacic acid (Cb=10 diacid), PA 6.6, PA 6.12, PA 10.10, PA 10.12, PA 11/10.T, that is to say a copolyamide resulting from the polycondensation of 10-aminoundecanoic acid (A=11); and of decanediamine (Ca=10 diamine) and of terephthalic acid (denoted T), PA 11/6.T, 12/10.T, 6.10/10.T, that is to say a copolyamide resulting from hexanediamine (Ca=6 diamine) and sebacic acid (Cb=10 diacid), and decanediamine (Ca=10 diamine) and terephthalic acid (denoted T), 6.12/10.T0 10.1/10.T, 10.12/10.T, 11/6.T/10.T, 12.12/10.T, 12/6.10/10.T, that is to say a terpolyamide resulting from the polycondensation of lauryllactam (A=12); of hexanediamine (Ca=6 diamine) and of sebacic acid (Cb=10 diacid); and of decanediamine (Ca=10 diamine) and of terephthalic acid (denoted T), 12/6.12/10.T, 12/10.10/10.T, 12/10.12/10.T and 12/12.12/10.T. As mentioned above, the nomenclature of polyamides is established by standard ISO 1874-1:1992.

Preferably, the polyamide block exhibits a number-average molecular weight, measured by potentiometry, of between 600 and 20 000, preferably between 4000 and 10 000, g/mol.

Preferably, the block copolymer of use according to the invention comprises a content of polyamide block of between 2% and 98%, preferably between 30% and 95%, more preferably between 50% and 94%, preferentially between 70% and 92% and more preferably still between 75% and 90%, by weight, with respect to the total weight of the block copolymer.

Chain Terminations

The polyamide block or blocks can be terminated by amine or acid functional groups, or can be functionalized so as to be terminated by isocyanate and anhydride functional groups, and preferably be terminated by amine functional groups.

Polyolefin Block

The block copolymers of use according to the invention comprise, in their structure, at least one polyolefin block.

Polyolefin block should be understood, according to the invention, as meaning any homopolymer or copolymer resulting, at least in part, from diene monomers (monomers bearing two conjugated or non-conjugated carbon-carbon double bonds). The polyolefin block comprises unsaturations of carbon-carbon double bond type. The unsaturated polyolefin block can belong to any category of diene polymer resulting, at least in part, from conjugated or non-conjugated diene monomers. It is any type of polyolefin block within the meaning known to a person skilled in the art, provided that this polyolefin block is unsaturated.

The unsaturated polyolefin block comprises unsaturations along the chain or else pendant to the chain. The content by weight of the monomer units bearing these unsaturations varies within a wide range which makes it possible to encompass the various categories of polyolefin blocks. Thus, the appropriate polyolefin blocks can be weakly unsaturated, with a content by weight of unsaturated monomer units of at least 1%, with respect to the total weight of the polyolefin block. According to alternative forms, this content can then be at least 5% by weight, indeed even at least 10% by weight. The polyolefin blocks can also be highly unsaturated, with a content by weight of unsaturated monomer units of greater than 20% and which can reach 100%, with respect to the total weight of the polyolefin block. According to some alternative forms, this content can then be at least 40% and indeed even at least 50%.

Polyolefin block capable of being used in the invention is understood more particularly to mean a polyolefin block corresponding to one of the following categories:

(a) any homopolymer obtained by polymerization of a conjugated diene monomer having from 4 to 12 carbon atoms;

(b) any copolymer obtained by copolymerization of one or more conjugated dienes having from 4 to 12 carbon atoms with one another or with one or more ethylenically unsaturated monomers;

(c) any homopolymer obtained by polymerization of a non-conjugated diene monomer having from 5 to 12 carbon atoms;

(d) any copolymer obtained by copolymerization of one or more of the non-conjugated dienes having from 5 to 12 carbon atoms with one another or with one or more ethylenically unsaturated monomers;

(e) a ternary copolymer obtained by copolymerization of ethylene and of an α-olefin having from 3 to 6 carbon atoms with a non-conjugated diene monomer having from 5 to 12 carbon atoms, such as, for example, the elastomers obtained from ethylene and propylene with a non-conjugated diene monomer, such as described in particular in the documents WO 2004/035639A1 and US 2005/0239639A1;

(f) a copolymer of isobutene and of isoprene (butyl rubber) and also the halogenated versions, in particular chlorinated or brominated versions, of this type of copolymer;

(g) natural rubber;

(h) an unsaturated olefinic copolymer, the chain of which comprises at least olefinic monomer units, that is to say units resulting from the insertion of at least one monoolefin, and diene units resulting from at least one conjugated or non-conjugated diene;

(i) a mixture of several of the elastomers defined in (a) to (h) with one another.

Mention may be made, as conjugated diene monomer appropriate for the synthesis of the polyolefin blocks (a), (b) and (h), of 1,3-butadiene, 2-methyl-1,3-butadiene, 2,3-di ($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

Mention may be made, as non-conjugated diene monomer appropriate for the synthesis of the polyolefin blocks (c), (d) and (e), of 1,4-pentadiene, 1,4-hexadiene, ethylidenenorbornene or dicyclopentadiene.

The copolymers (b) or (d) can contain between 99% and 1% by weight of diene units and between 1% and 99% by weight of vinylaromatic, vinyl nitrile and/or acrylic ester units.

Mention may be made, as monoolefin monomer appropriate for the synthesis of the polyolefin blocks (h), of ethylene or an α-olefin having from 3 to 6 carbon atoms, for example propylene. Preferably, the monoolefin monomer is ethylene.

According to certain alternative forms, the olefinic copolymer (h) capable of being used in the block copolymer of use according to the invention is a copolymer, the chain of which comprises olefinic monomer units, that is to say units resulting from the insertion of at least one monoolefin, and diene units resulting from at least one conjugated diene. According to other alternative forms, the units are not fully units resulting from diene monomers and from monoolefinic monomers. According to these alternative forms, other units resulting, for example, from an ethylenically unsaturated monomer as described above are present in the carbon chain.

Mention may be made, among the polyolefin blocks resulting from at least one conjugated diene monomer, as non-exclusive examples, of polybutadiene, polyisoprene, polychloroprene, polyisobutylene, block copolymers of butadiene and isoprene with styrene, such as poly(styrene-b-butadiene) (SB), poly(styrene-b-butadiene-b-styrene) (SBS), poly(styrene-b-isoprene-b-styrene) (SIS), poly[styrene-b-(isoprene-stat-butadiene)-b-styrene] or poly(styrene-b-isoprene-b-butadiene-b-styrene) (SIBS), hydrogenated SBS (SEBS), poly(styrene-b-butadiene-b-methyl methacrylate) (SBM), statistical copolymers of butadiene with styrene (SBR) and acrylonitrile (NBR), statistical copolymers of isoprene with styrene (SIR), statistical copolymers of isoprene and butadiene with styrene (SBIR), butyl or halogenated rubbers, ethylene-propylene-diene terpolymers (EPDM), ethylene-diene copolymers and their mixtures.

Among these, the polyolefin block or blocks are very particularly selected from the group of the polyolefin blocks consisting of polybutadienes (abbreviated to "BRs"), synthetic polyisoprenes (IRs), natural rubber (NR), butadiene copolymers, isoprene copolymers, ethylene-diene copolymers and the mixtures of these polymers.

Preferably, the polyolefin block is polybutadiene. The polybutadiene can comprise cis-1,4-, trans-1,4- or 1,2-sequences or a mixture of these. Preferably, the polybutadiene predominantly (that is to say, for more than 50% by number of 1,4- and 1,2-sequences) comprises 1,2-sequences.

Advantageously, the block copolymer comprises a content of polyolefin block of between 2% and 98%, preferably between 5% and 70%, more preferably between 6% and 50%, preferentially between 8% and 30% and more preferably still between 9% and 25% by weight, with respect to the total weight of the block copolymer.

Chain Terminations

The polyolefin block or blocks can be functionalized so as to terminate in functional groups chosen from amine, acid, alcohol, isocyanate and anhydride.

More preferably, the polyolefin block is a polybutadiene block, terminated by alcohol functional groups.

The product with the commercial name Krasol® or Poly Bd® sold by Cray Valley can be used.

Physicochemical Properties of the Polyolefin Block

The polyolefin block can exhibit a viscosity of less than 60 000 cPs, preferably of less than 40 000 cPs, and preferably of less than 20 000 cPs and more preferably between 1000 and 20 000 cPs, the viscosity being measured at 25° C. with a Brookfield device and according to the Brookfield method.

Advantageously, the polyolefin block has a number-average molecular weight of between 1000 and 10 000, in particular between 1000 and 4000.

Intermediate Bonds Between the Blocks

The polyamide and polyolefin block or blocks can be terminated by functional groups chosen from amine, acid, isocyanate, alcohol and anhydride. The polyolefin and polyamide block or blocks can be modified so as to terminate in these functional groups.

Consequently, the bonds between the blocks can be ester, amide, urea and/or urethane functional groups.

Alkylene Block

The block copolymers of use according to the invention may comprise, in their structure, at least one alkylene block.

Alkylene block is understood to mean, within the meaning of the present invention, a saturated linear aliphatic chain.

The alkylene block or blocks are connected to the other polymer blocks of the copolymer according to the invention via functional groups, such as those chosen from amine, acid, alcohol, isocyanate and anhydride.

Preferably, the alkylene block is a $C_2$-$C_{36}$ diacid, more preferably a $C_8$-$C_{36}$ diacid, in particular a $C_{10}$-$C_{36}$ diacid.

More preferably, the block copolymer of use according to the invention comprises at least one alkylene block terminated by acid functional groups.

More preferably still, the block copolymer of use according to the invention comprises at least one alkylene block comprising between 2 and 36 carbon atoms, preferably between 8 and 36 carbon atoms, in particular between 10 and 36 carbon atoms. More particularly, the alkylene block is a fatty diacid.

More particularly, the alkylene block is a fatty acid dimer or else a dimerized fatty acid.

Preferably, the alkylene block exhibits a molar mass of less than 1000 g/mol, preferably of less than 800 g/mol, more preferably of less than 600 g/mol.

Preferably, the block copolymer of use according to the invention is characterized by a specific arrangement: the alkylene block is found between a polyamide block and a polyolefin block.

Consequently, the alkylene block acts as linker between the polyamide and polyolefin polymer blocks.

The product with the commercial name Pripol® sold by Croda can be used.

The product with the commercial name Empol® sold by Cognis can be used.

The product with the commercial name Unydime® sold by Arizona Chemical can be used.

The product with the commercial name Radiacid® sold by Oleon can be used.

Advantageously, the block copolymer of use according to the invention comprises:
at least one polyamide block, as defined above,
at least one polyolefin block, as defined above, and
at least one alkylene block, as defined above.

Arrangement of the Copolymer

According to a first embodiment, the block copolymer of use according to the invention has the following formula:

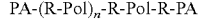

PA-(R-Pol)$_n$-R-Pol-R-PA with n between 0 and 100, in particular from 0 to 10, preferably 0 or 1,
PA denoting the polyamide block,
R denoting the alkylene block,
Pol denoting the polyolefin block.

According to a second embodiment, the block copolymer of use according to the invention has the following formula:

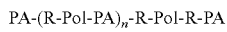

PA-(R-Pol-PA)$_n$-R-Pol-R-PA with n between 0 and 100, in particular from 0 to 10, preferably 0 or 1, PA, R and Pol being as defined above.

According to a third embodiment, the block copolymer of use according to the invention has the following formula:

PA-(R-Pol-R-PA)$_n$-R-Pol-R-PA with n between 0 and 100, in particular from 0 to 10, preferably 0 or 1, PA, R and Pol being as defined above.

Content of the Blocks

Preferably, the block copolymer present in the sheathing composition according to the invention comprises a content of alkylene block of between 0.1% and 25%, preferably between 1% and 15%, by weight, with respect to the total weight of the block copolymer.

Advantageously, the block copolymer of use according to the invention comprises a content of alkylene block of between 0.1% and 25%, a content of polyamide block of between 2% and 98% and a content of polyolefin block of between 2% and 98%, by weight, with respect to the total weight of the block copolymer, the sum being equal to 100%.

Advantageously, the block copolymer of use according to the invention comprises a content of alkylene block of between 0.1% and 25%, a content of polyamide block of between 2% and 98% and a content of polyolefin block of between 5% and 70%, by weight, with respect to the total weight of the block copolymer, the sum being equal to 100%.

Advantageously, the block copolymer of use according to the invention comprises a content of alkylene block of between 0.1% and 25%, a content of polyamide block of between 2% and 98% and a content of polyolefin block of between 6% and 50%, by weight, with respect to the total weight of the block copolymer, the sum being equal to 100%.

Advantageously, the block copolymer of use according to the invention comprises a content of alkylene block of between 0.1% and 25%, a content of polyamide block of between 2% and 98% and a content of polyolefin block of between 8% and 30%, by weight, with respect to the total weight of the block copolymer, the sum being equal to 100%.

Advantageously, the block copolymer of use according to the invention comprises a content of alkylene block of between 0.1% and 25%, a content of polyamide block of between 2% and 98% and a content of polyolefin block of between 10% and 25%, by weight, with respect to the total weight of the block copolymer, the sum being equal to 100%.

Advantageously, the block copolymer of use according to the invention comprises a content of alkylene block of between 0.1% and 25%, a content of polyamide block of between 30% and 95% and a content of polyolefin block of between 2% and 98%, by weight, with respect to the total weight of the block copolymer, the sum being equal to 100%.

Advantageously, the block copolymer of use according to the invention comprises a content of alkylene block of between 0.1% and 25%, a content of polyamide block of between 30% and 95% and a content of polyolefin block of between 5% and 70%, by weight, with respect to the total weight of the block copolymer, the sum being equal to 100%.

Advantageously, the block copolymer of use according to the invention comprises a content of alkylene block of between 0.1% and 25%, a content of polyamide block of between 30% and 95% and a content of polyolefin block of between 6% and 50%, by weight, with respect to the total weight of the block copolymer, the sum being equal to 100%.

Advantageously, the block copolymer of use according to the invention comprises a content of alkylene block of between 0.1% and 25%, a content of polyamide block of between 30% and 95% and a content of polyolefin block of between 8% and 30%, by weight, with respect to the total weight of the block copolymer, the sum being equal to 100%.

Advantageously, the block copolymer of use according to the invention comprises a content of alkylene block of between 0.1% and 25%, a content of polyamide block of between 30% and 95% and a content of polyolefin block of between 10% and 25%, by weight, with respect to the total weight of the block copolymer, the sum being equal to 100%.

Advantageously, the block copolymer of use according to the invention comprises a content of alkylene block of between 0.1% and 25%, a content of polyamide block of between 50% and 94% and a content of polyolefin block of between 2% and 98%, by weight, with respect to the total weight of the block copolymer, the sum being equal to 100%.

Advantageously, the block copolymer of use according to the invention comprises a content of alkylene block of between 0.1% and 25%, a content of polyamide block of between 50% and 94% and a content of polyolefin block of between 5% and 70%, by weight, with respect to the total weight of the block copolymer, the sum being equal to 100%.

Advantageously, the block copolymer of use according to the invention comprises a content of alkylene block of between 0.1% and 25%, a content of polyamide block of between 50% and 94% and a content of polyolefin block of between 6% and 50%, by weight, with respect to the total weight of the block copolymer, the sum being equal to 100%.

Advantageously, the block copolymer of use according to the invention comprises a content of alkylene block of between 0.1% and 25%, a content of polyamide block of between 50% and 94% and a content of polyolefin block of between 8% and 30%, by weight, with respect to the total weight of the block copolymer, the sum being equal to 100%.

Advantageously, the block copolymer of use according to the invention comprises a content of alkylene block of between 0.1% and 25%, a content of polyamide block of between 50% and 94% and a content of polyolefin block of between 10% and 25%, by weight, with respect to the total weight of the block copolymer, the sum being equal to 100%.

Advantageously, the block copolymer of use according to the invention comprises a content of alkylene block of between 0.1% and 25%, a content of polyamide block of between 70% and 92% and a content of polyolefin block of between 2% and 98%, by weight, with respect to the total weight of the block copolymer, the sum being equal to 100%.

Advantageously, the block copolymer of use according to the invention comprises a content of alkylene block of between 0.1% and 25%, a content of polyamide block of between 70% and 92% and a content of polyolefin block of between 5% and 70%, by weight, with respect to the total weight of the block copolymer, the sum being equal to 100%.

Advantageously, the block copolymer of use according to the invention comprises a content of alkylene block of between 0.1% and 25%, a content of polyamide block of between 70% and 92% and a content of polyolefin block of between 6% and 50%, by weight, with respect to the total weight of the block copolymer, the sum being equal to 100%.

Advantageously, the block copolymer of use according to the invention comprises a content of alkylene block of between 0.1% and 25%, a content of polyamide block of between 70% and 92% and a content of polyolefin block of between 8% and 30%, by weight, with respect to the total weight of the block copolymer, the sum being equal to 100%.

Advantageously, the block copolymer of use according to the invention comprises a content of alkylene block of between 0.1% and 25%, a content of polyamide block of between 70% and 92% and a content of polyolefin block of between 10% and 25%, by weight, with respect to the total weight of the block copolymer, the sum being equal to 100%.

Advantageously, the block copolymer of use according to the invention comprises a content of alkylene block of between 0.1% and 25%, a content of polyamide block of between 75% and 90% and a content of polyolefin block of between 2% and 98%, by weight, with respect to the total weight of the block copolymer, the sum being equal to 100%.

Advantageously, the block copolymer of use according to the invention comprises a content of alkylene block of between 0.1% and 25%, a content of polyamide block of between 75% and 90% and a content of polyolefin block of between 5% and 70%, by weight, with respect to the total weight of the block copolymer, the sum being equal to 100%.

Advantageously, the block copolymer of use according to the invention comprises a content of alkylene block of between 0.1% and 25%, a content of polyamide block of between 75% and 90% and a content of polyolefin block of between 6% and 50%, by weight, with respect to the total weight of the block copolymer, the sum being equal to 100%.

Advantageously, the block copolymer of use according to the invention comprises a content of alkylene block of between 0.1% and 25%, a content of polyamide block of between 75% and 90% and a content of polyolefin block of between 8% and 30%, by weight, with respect to the total weight of the block copolymer, the sum being equal to 100%.

Advantageously, the block copolymer of use according to the invention comprises a content of alkylene block of between 0.1% and 25%, a content of polyamide block of between 75% and 90% and a content of polyolefin block of between 10% and 25%, by weight, with respect to the total weight of the block copolymer, the sum being equal to 100%.

Advantageously, the block copolymer of use according to the invention comprises a content of alkylene block of between 1% and 15%, a content of polyamide block of between 2% and 98% and a content of polyolefin block of between 2% and 98%, by weight, with respect to the total weight of the block copolymer, the sum being equal to 100%.

Advantageously, the block copolymer of use according to the invention comprises a content of alkylene block of between 1% and 15%, a content of polyamide block of between 2% and 98% and a content of polyolefin block of between 5% and 70%, by weight, with respect to the total weight of the block copolymer, the sum being equal to 100%.

Advantageously, the block copolymer of use according to the invention comprises a content of alkylene block of between 1% and 15%, a content of polyamide block of between 2% and 98% and a content of polyolefin block of between 6% and 50%, by weight, with respect to the total weight of the block copolymer, the sum being equal to 100%.

Advantageously, the block copolymer of use according to the invention comprises a content of alkylene block of between 1% and 15%, a content of polyamide block of between 2% and 98% and a content of polyolefin block of between 8% and 30%, by weight, with respect to the total weight of the block copolymer, the sum being equal to 100%.

Advantageously, the block copolymer of use according to the invention comprises a content of alkylene block of between 1% and 15%, a content of polyamide block of between 2% and 98% and a content of polyolefin block of between 10% and 25%, by weight, with respect to the total weight of the block copolymer, the sum being equal to 100%.

Advantageously, the block copolymer of use according to the invention comprises a content of alkylene block of between 1% and 15%, a content of polyamide block of between 30% and 95% and a content of polyolefin block of between 2% and 98%, by weight, with respect to the total weight of the block copolymer, the sum being equal to 100%.

Advantageously, the block copolymer of use according to the invention comprises a content of alkylene block of between 1% and 15%, a content of polyamide block of between 30% and 95% and a content of polyolefin block of between 5% and 70%, by weight, with respect to the total weight of the block copolymer, the sum being equal to 100%.

Advantageously, the block copolymer of use according to the invention comprises a content of alkylene block of between 1% and 15%, a content of polyamide block of between 30% and 95% and a content of polyolefin block of between 6% and 50%, by weight, with respect to the total weight of the block copolymer, the sum being equal to 100%.

Advantageously, the block copolymer of use according to the invention comprises a content of alkylene block of between 1% and 15%, a content of polyamide block of between 30% and 95% and a content of polyolefin block of between 8% and 30%, by weight, with respect to the total weight of the block copolymer, the sum being equal to 100%.

Advantageously, the block copolymer of use according to the invention comprises a content of alkylene block of between 1% and 15%, a content of polyamide block of between 30% and 95% and a content of polyolefin block of between 10% and 25%, by weight, with respect to the total weight of the block copolymer, the sum being equal to 100%.

Advantageously, the block copolymer of use according to the invention comprises a content of alkylene block of between 1% and 15%, a content of polyamide block of between 50% and 94% and a content of polyolefin block of between 2% and 98%, by weight, with respect to the total weight of the block copolymer, the sum being equal to 100%.

Advantageously, the block copolymer of use according to the invention comprises a content of alkylene block of between 1% and 15%, a content of polyamide block of between 50% and 94% and a content of polyolefin block of between 5% and 70%, by weight, with respect to the total weight of the block copolymer, the sum being equal to 100%.

Advantageously, the block copolymer of use according to the invention comprises a content of alkylene block of between 1% and 15%, a content of polyamide block of between 50% and 94% and a content of polyolefin block of between 6% and 50%, by weight, with respect to the total weight of the block copolymer, the sum being equal to 100%.

Advantageously, the block copolymer of use according to the invention comprises a content of alkylene block of between 1% and 15%, a content of polyamide block of between 50% and 94% and a content of polyolefin block of between 8% and 30%, by weight, with respect to the total weight of the block copolymer, the sum being equal to 100%.

Advantageously, the block copolymer of use according to the invention comprises a content of alkylene block of between 1% and 15%, a content of polyamide block of between 50% and 94% and a content of polyolefin block of between 10% and 25%, by weight, with respect to the total weight of the block copolymer, the sum being equal to 100%.

Advantageously, the block copolymer of use according to the invention comprises a content of alkylene block of between 1% and 15%, a content of polyamide block of between 70% and 92% and a content of polyolefin block of between 2% and 98%, by weight, with respect to the total weight of the block copolymer, the sum being equal to 100%.

Advantageously, the block copolymer of use according to the invention comprises a content of alkylene block of between 1% and 15%, a content of polyamide block of between 70% and 92% and a content of polyolefin block of between 5% and 70%, by weight, with respect to the total weight of the block copolymer, the sum being equal to 100%.

Advantageously, the block copolymer of use according to the invention comprises a content of alkylene block of between 1% and 15%, a content of polyamide block of between 70% and 92% and a content of polyolefin block of between 6% and 50%, by weight, with respect to the total weight of the block copolymer, the sum being equal to 100%.

Advantageously, the block copolymer of use according to the invention comprises a content of alkylene block of between 1% and 15%, a content of polyamide block of between 70% and 92% and a content of polyolefin block of between 8% and 30%, by weight, with respect to the total weight of the block copolymer, the sum being equal to 100%.

Advantageously, the block copolymer of use according to the invention comprises a content of alkylene block of between 1% and 15%, a content of polyamide block of between 70% and 92% and a content of polyolefin block of between 10% and 25%, by weight, with respect to the total weight of the block copolymer, the sum being equal to 100%.

Advantageously, the block copolymer of use according to the invention comprises a content of alkylene block of between 1% and 15%, a content of polyamide block of between 75% and 90% and a content of polyolefin block of between 2% and 98%, by weight, with respect to the total weight of the block copolymer, the sum being equal to 100%.

Advantageously, the block copolymer of use according to the invention comprises a content of alkylene block of between 1% and 15%, a content of polyamide block of between 75% and 90% and a content of polyolefin block of between 5% and 70%, by weight, with respect to the total weight of the block copolymer, the sum being equal to 100%.

Advantageously, the block copolymer of use according to the invention comprises a content of alkylene block of between 1% and 15%, a content of polyamide block of between 75% and 90% and a content of polyolefin block of between 6% and 50%, by weight, with respect to the total weight of the block copolymer, the sum being equal to 100%.

Advantageously, the block copolymer of use according to the invention comprises a content of alkylene block of between 1% and 15%, a content of polyamide block of between 75% and 90% and a content of polyolefin block of between 8% and 30%, by weight, with respect to the total weight of the block copolymer, the sum being equal to 100%.

Advantageously, the block copolymer of use according to the invention comprises a content of alkylene block of between 1% and 15%, a content of polyamide block of between 75% and 90% and a content of polyolefin block of between 10% and 25%, by weight, with respect to the total weight of the block copolymer, the sum being equal to 100%.

Advantageously, in the block copolymer of use according to the invention comprising a polyamide block, a polyolefin block and an alkylene block as defined above, the polyolefin block is a polybutadiene.

Advantageously, in the block copolymer of use according to the invention comprising a polyamide block, a polyolefin block and an alkylene block as defined above, the polyolefin block is a polybutadiene terminated by alcohol functional groups.

Advantageously, in the block copolymer of use according to the invention comprising a polyamide block, a polyolefin block and an alkylene block as defined above, the polyolefin block is a polybutadiene and the alkylene block is a $C_2$-$C_{36}$ diacid, preferably a $C_8$-$C_{36}$ diacid, in particular a $C_{10}$-$C_{36}$ diacid.

Advantageously, in the block copolymer of use according to the invention comprising a polyamide block, a polyolefin block and an alkylene block as defined above, the polyolefin block is a polybutadiene and the alkylene block is a fatty diacid.

Advantageously, in the block copolymer of use according to the invention comprising a polyamide block, a polyolefin block and an alkylene block as defined above, the polyolefin block is a polybutadiene and the alkylene block is a fatty acid dimer.

Advantageously, in the block copolymer of use according to the invention comprising a polyamide block, a polyolefin block and an alkylene block as defined above, the polyolefin block is a polybutadiene terminated by alcohol functional groups and the alkylene block is a $C_8$-$C_{36}$ diacid, in particular a $C_{10}$-$C_{36}$ diacid.

Advantageously, in the block copolymer of use according to the invention comprising a polyamide block, a polyolefin block and an alkylene block as defined above, the polyolefin block is a polybutadiene terminated by alcohol functional groups and the alkylene block is a fatty diacid.

Advantageously, in the block copolymer of use according to the invention comprising a polyamide block, a polyolefin block and an alkylene block as defined above, the polyolefin block is a polybutadiene terminated by alcohol functional groups and the alkylene block is a fatty acid dimer.

Chain-Extending Block

The block copolymer of use according to the invention can optionally comprise at least one chain-extending block.

This chain-extending block has the structure:

$$Y1\text{-}A'\text{-}Y1$$

with A' being a hydrocarbon biradical of non-polymeric structure (neither polymer, nor oligomer, nor prepolymer), bearing 2 identical terminal reactive functional groups Y1 (as defined in the formula above) which are reactive by polyaddition (without elimination of a reaction byproduct) with at least one functional group at the chain end of the block copolymer of use according to the invention, preferably with a number-average molecular weight of less than 500 and more preferably of less than 400;

in particular, the reactive functional group Y1 is chosen from: oxazine, oxazoline, oxazolinone, oxazinone, imidazoline, epoxy, isocyanate, maleimide or cyclic anhydride.

Mention may be made, as suitable examples of chain extenders, of the following:

when the chain terminations are $NH_2$ or OH functional groups, preferably $NH_2$ functional groups, the chain extender Y1-A'-Y1 corresponds to:

Y1 chosen from the groups: maleimide, optionally blocked isocyanate, oxazinone and oxazolinone, cyclic anhydride, preferably oxazinone, anhydride and oxazolinone, and A' is a carbon-based spacer or radical bearing the reactive functional groups or groups Y1 chosen from:

a covalent bond between two Y1 functional groups (groups) in the case where Y1=oxazinone and oxazolinone, or an aliphatic hydrocarbon chain or an aromatic and/or cycloaliphatic hydrocarbon chain, the latter two comprising at least one optionally substituted ring of 5 or 6 carbon atoms, with optionally the said aliphatic hydrocarbon chain optionally having a number-average molecular weight of 14 to 200 g·mol$^{-1}$.

The chain extender Y1-A'-Y1 can also correspond to a structure in which:

Y1 is a caprolactam group and

A' is a carbonyl radical, such as carbonybiscaprolactam, or it being possible for A' to be a terephthaloyl or an isophthaloyl.

The chain extender Y1-A'-Y1 can also bear a cyclic anhydride group Y1 and this extender is preferably chosen from a cycloaliphatic and/or aromatic carboxylic dianhydride and more preferably it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenonetetracarboxylic dianhydride, 1,2,3,4-cyclobutanetetracarboxylic dianhydride, hexafluoroisopropylidene bisphthalic dianhydride, 9,9-bis (trifluoromethyl)xanthenetetracarboxylic dianhydride, 3,3', 4,4'-diphenylsulfonetetracarboxylic dianhydride, bicyclo [2.2.2]oct-7-ene-2,3,5,6-tetracarboxylic dianhydride, 1,2,3, 4-cyclopentanetetracarboxylic dianhydride, 3,3',4,4'-diphenyl ether tetracarboxylic dianhydride or their mixtures, and when the chain terminations are COOH functional
groups:
the said chain extender Y1-A'-Y1 corresponds to:
Y1 chosen from the groups: oxazoline, oxazine, imidazoline, aziridine, such as 1,1'-iso- or terephthaloylbis(2-methylaziridine), or epoxy,
A' being a carbon-based spacer or radical as defined above.

More particularly, when, in the said extender Y1-A'-Y1, the said functional group Y1 is chosen from oxazinone, oxazolinone, oxazine, oxazoline or imidazoline, in particular oxazoline, in this case, in the chain extender represented by Y1-A'-Y1, A' can represent an alkylene, such as —($CH_2$)$_m$—, with m ranging from 1 to 14 and preferably from 2 to 10, or A' can represent a cycloalkylene and/or an arylene which is substituted (alkyl) or unsubstituted, such as benzenic arylenes, for example o-, m- or p-phenylenes, or naphthalenic arylenes, and preferably A' is an arylene and/or a cycloalkylene.

In the case where Y1 is an epoxy, the chain extender can be chosen from bisphenol A diglycidyl ether (BADGE) and its hydrogenated (cycloaliphatique) derivative bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with an Mn<500, polypropylene glycol diglycidyl ether with an Mn<500, polytetramethylene glycol diglycidyl ether with an Mn<500, resorcinol diglycidyl ether, neopentyl glycol diglycidyl ether, bisphenol A polyethylene glycol diglycidyl ether with an Mn<500, bisphenol A polypropylene glycol diglycidyl ether with an Mn<500, dicarboxylic acid diglycidyl esters, such as terephthalic acid glycidyl ester, or epoxidized diolefins (dienes) or fatty acids having epoxidized ethylenic double unsaturation, diglycidyl 1,2-cyclohexanedicarboxylate, and their mixtures.

In the case of carbonyl- or terephthaloyl- or isophthaloyl-biscaprolactam as chain extender Y1-A'-Y1, the preferred conditions prevent the removal of byproduct, such as caprolactam, during the said polymerization and melt processing.

In the optional case cited above where Y1 represents a blocked isocyanate functional group, this blocking can be obtained by blocking agents for the isocyanate functional group, such as epsilon-caprolactam, methyl ethyl ketoxime, dimethylpyrazole or diethyl malonate.

Likewise, in the case where the extender is a dianhydride which reacts with $NH_2$ functional groups resulting from the block copolymer, the preferred conditions prevent any formation of imide ring during the polymerization and during the melt processing.

For the OH or $NH_2$ endings of the block copolymer, the Y1 group is preferably chosen from: anhydride, isocyanate (non-blocked), oxazinone and oxazolinone, more preferably oxazinone and oxazolinone, with as spacer (radical) A' being as defined above.

Reference may be made, as examples of chain extenders bearing oxazoline or oxazine reactive functional groups Y which are suitable for the implementation of the invention, to those described under references "A", "B", "C" and "D" on page 7 of Application EP 0 581 642, and also to their processes of preparation and their modes of reaction which are set out therein. "A" in this document is bisoxazoline, "B" is bisoxazine, "C" is 1,3-phenylenebisoxazoline and "D" is 1,4-phenylenebisoxazoline.

By way of example, in the case where the terminations of the block copolymer are $CO_2H$ terminations and the chain extender Y1-A'-Y1 is 1,4-phenylenebisoxazoline, the reaction product obtained has at least one repeat unit with the following structure:

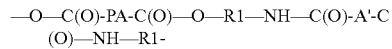

in which:
PA is a polyamide having acid terminations HO—C(O)-PA-C(O)—OH as defined above,
R1 is ($CH_2$)$_2$, and
A' is a phenyl.

Reference may be made, as examples of chain extenders having an imidazoline reactive functional group Y which are suitable for the implementation of the invention, to those described ("A" to "F") on pages 7 and 8 and in Table 1 of page 10 in Application EP 0 739 924, and also to their processes of preparation and their modes of reaction which are set out therein.

Reference may be made, as examples of chain extenders having a reactive functional group Y1=oxazinone ou oxazolinone which are suitable for the implementation of the invention, to those described under references "A" to "D" on pages 7 and 8 of Application EP 0 581 641, and also to their processes of preparation and their modes of reaction which are set out therein.

Mention may be made, as examples of suitable oxazinone (6-membered ring) and oxazolinone (5-membered ring) Y1 groups, of the Y1 groups derived from: benzoxazinone, oxazinone or oxazolinone, with, as spacer, A' being able to be a single covalent bond, with for respective corresponding extenders being: bis(benzoxazinone), bisoxazinone and bisoxazolinone.

A' can also be a $C_1$ to $C_{14}$ alkylene, preferably a $C_2$ to $C_{10}$ alkylene, but preferably A' is an arylene and more particularly it can be a phenylene (substituted by Y1 in the 1,2- or 1,3- or 1,4-positions) or a naphthalene radical (disubstituted by Y1) or a phthaloyl (iso- or terephthaloyl) or A' can be a cycloalkylene.

For the Y1 functional groups such as oxazine (6-membered ring), oxazoline (5-membered ring) and imidazoline (5-membered ring), the A' radical can be as described above with A' being able to be a single covalent bond and with the respective corresponding extenders being: bisoxazine, bisoxazoline and bisimidazoline. A' can also be a $C_1$ to $C_{14}$ alkylene, preferably a $C_2$ to $C_{10}$ alkylene. The A' radical is preferably an arylene and more particularly it can be a phenylene (substituted by Y1 in the 1,2- or 1,3- or 1,4-positions) or a naphthalene radical (disubstituted by Y1) or a phthaloyl (iso- or terephthaloyl) or A' can be a cycloalkylene.

In the case where Y1=aziridine (3-membered nitrogenous heterocycle equivalent to ethylene oxide with the replacement of the ether —O— by —NH—), the A' radical can be a phthaloyl (1,1'-iso- or terephthaloyl) with, as example of extender of this type, 1,1'-isophthaloylbis(2-methylaziridine).

The presence of a catalyst of the reaction between the block copolymer and the said extender Y1-A'-Y1 at a content ranging from 0.001% to 2%, preferably from 0.01% to 0.5%, with respect to the total weight of the two coreactants cited, can accelerate the (poly)addition reaction and thus shorten the production cycle. Such a catalyst can be chosen from: 4-dimethylaminopyridine, p-toluenesulfonic acid, phosphoric acid, NaOH and optionally those described for a polycondensation or transesterification as described in EP 0 425 341, page 9, lines 1 to 7.

According to a more specific case of the choice of the said extender, A' can represent an alkylene, such as —$(CH_2)_m$—, with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthylenes). Preferably, A' represents an arylene which can be substituted or unsubstituted naphthalenic or benzenic.

As already specified, the said chain extender has a non-polymeric structure and preferably a number-average molecular weight of less than 500, more preferably of less than 400.

Preferably, the block copolymer of use according to the invention comprises at least one chain-extending block located at one or more polyamide ends of the copolymer.

The content of the said extender in the said block copolymer varies from 1% to 20%, in particular from 5% to 20%, by weight, with respect to the total weight of the block copolymer.

Advantageously, in the latter block copolymer of use according to the invention, the said extender comprises reactive functional groups Y1 chosen from anhydride, (non-blocked) isocyanate, oxazinone and oxazolinone, more preferably anhydride, oxazinone and oxazolinone, the spacer or the radical A' being as defined above.

Advantageously, in the block copolymer of use according to the invention comprising (or consisting of) a polyamide block, an alkylene block and a polyolefin block as defined above, the content of said extender from 5% to 20%, with respect to the total weight of the block copolymer, the total being equal to 100%.

Advantageously, in the latter block copolymer of use according to the invention, the said extender comprises reactive functional groups Y1 chosen from anhydride, (non-blocked) isocyanate, oxazinone and oxazolinone, more preferably anhydride, oxazinone and oxazolinone, the spacer or the radical A' being as defined above.

Proportions of the Blocks

Preferably, the block copolymer according to the invention comprises:
- a content of polyamide block of between 2% and 98% by weight, with respect to the total weight of the block copolymer,
- a content of polyolefin block of between 2% and 98% by weight, with respect to the total weight of the block copolymer.

Preferably, the block copolymer according to the invention comprises:
- a content of polyamide block of between 2% and 98% by weight, with respect to the total weight of the block copolymer,
- a content of polyolefin block of between 2% and 98% by weight, with respect to the total weight of the block copolymer,
- a content of alkylene block of between 0.1 and 2.5%, preferably between 1 and 15% by weight, with respect to the total weight of the block copolymer.

The process for the preparation of the block copolymer of use according to the invention comprises a stage of mixing the different blocks.

Preferably, the process comprises the following successive stages:
- a stage of mixing the polyolefin and alkylene blocks, the molar ratio of the polyolefin blocks to the alkylene blocks being greater than or equal to ½, then
- a stage of mixing the polyamide block or blocks with the mixture obtained in the preceding stage.

The preparation process can comprise an additional stage of mixing chain-extending blocks as defined above with the mixture obtained in the preceding stage.

Sheathing

According to one embodiment, the sheath comprises a single layer of the sheathing composition defined above.

According to another embodiment, the sheath comprises several layers, at least one of them comprising the sheathing composition defined above.

The sheathing composition can consist of the block copolymer or can comprise one or more other constituents, for example chosen from thermoplastic polymers, elastomers and other non-polymeric components, processing aids, fillers, heat stabilizers, such as phosphite-based organic heat stabilizers, copper-based heat stabilizers, colourants, mould-release agents, flame retardants, surface-active agents, optical brighteners, antioxidants, such as those based on phenol or the product sold under the name Naugard 445® by Chemtura, UV stabilizers, such as HALS, and their mixtures. Preferably, the colourants are present in a proportion of 0% to 1.5%, in particular of 0.5% to 1%, by weight, with respect to the total weight of the composition. Preferably, the heat stabilizers are present in a proportion of 0% to 2%, in particular of 0.5% to 1%, by weight, with respect to the total weight of the composition, and the antioxidants are present in a proportion of 0% to 2%, in particular of 0.5% to 1%, by weight, with respect to the total weight of the composition.

The sheathing composition can also comprise catalysts, such as phosphoric acid or hypophosphorous acid ($H_3PO_2$, $H_3PO_3$ and $H_3PO_4$).

Mention may be made, among the processing aids, of stearates, such as calcium stearate or zinc stearate, natural waxes or polymers comprising tetrafluoroethylene (TFE).

The proportion by weight of processing aids is conventionally between 0.01% and 0.3% by weight, advantageously between 0.02% and 0.1% by weight, with respect to the total weight of the composition.

Mention may be made, among the fillers, of silica, graphite, expanded graphite, carbon black, glass beads, kaolin, magnesia, slag, talc, nanofillers (carbon nanotubes), pigments, metal oxides (titanium oxide), metals or fibres (aramid, glass or carbon fibres).

Depending on the nature of the fillers, the amount of the latter can represent up to 30% by weight of the total weight of the sheathing composition.

According to a preferred embodiment, the sheath comprises just one layer of the sheathing composition, the sheathing composition consisting of the block copolymer defined above.

The sheath present in the composite reinforcer of the invention preferably exhibits a thickness varying from 35 µm to 200 µm.

According to a preferred embodiment of the invention, the sheathing composition comprises at least 70% by weight of the block copolymer according to the invention.

According to a specific embodiment, the composite reinforcer of the invention, that is to say the reinforcing thread or threads covered with the sheath, comprises from 70% to 85% by weight, with respect to the weight of the composite reinforcer, of the reinforcing thread or threads and from 15% to 30% by weight, with respect to the weight of the composite reinforcer, of the sheathing composition as defined above.

Process for Sheathing the Reinforcing Thread or Threads

As explained above, the reinforcing thread or threads covered with the sheathing composition form a composite reinforcer.

The composite reinforcer of use in the invention is capable of being prepared according to a specific process comprising a stage of covering the reinforcing thread or threads with a block copolymer as defined above.

This stage is carried out in a way known to a person skilled in the art, for example in line and continuously or non-continuously. For example, it consists simply in passing the reinforcing thread or threads through dies of suitable diameter, in extrusion heads heated to appropriate temperatures, or else through a coating bath containing the block copolymer dissolved beforehand in an appropriate organic solvent (or mixture of organic solvents).

According to a possible first preferred embodiment, the reinforcing thread or threads are preheated, for example by induction heating or by IR radiation, before passing through the respective extrusion heads. On exiting from each extrusion head, the reinforcing thread or threads thus sheathed are subsequently sufficiently cooled so as to solidify the respective polymer layer, for example with air or another cold gas, or by passing through a water bath, followed by a drying stage.

By way of example, a reinforcing thread with a diameter of approximately 0.6 mm, for example a metal cord composed simply of two individual monofilaments with a diameter of 0.3 mm twisted together, is covered with a first layer of a block copolymer with a maximum thickness equal to approximately 0.4 mm, in order to obtain a sheathed reinforcing thread having a total diameter of approximately 1 mm, on an extrusion/sheathing line comprising two dies, a first die (counter-die or upstream die) with a diameter equal to approximately 0.65 mm and a second die (or downstream die) with a diameter equal to approximately 0.95 mm, both dies being positioned in an extrusion head brought to approximately 300° C. The fluorocopolymer, molten at a temperature of 290° C. in the extruder, thus covers the reinforcing thread via the sheathing head, at a rate of forward progression of the thread typically equal to several tens of m/min, for an extrusion pump throughput typically of several tens of $cm^3$/min. On exiting from this sheathing operation, the thread can be immersed in a cooling tank filled with cold water, in order to solidify and set the polyamide in its amorphous state, and then dried, for example by passing the take-up reel into the oven.

On conclusion of these operations described above, for example directly on exiting from the sheathing head or from the coating bath (after evaporation of the solvent in the second case), the composite thread passes through a tunnel oven, for example with a length of several metres, in order to undergo a heat treatment under air therein.

This treatment temperature is, for example, between 150° C. and 300° C., for treatment times from a few seconds to a few minutes as the case may be, it being understood that the duration of the treatment will be shorter the higher the temperature and that the heat treatment obviously must not lead to remelting or even excessive softening of the materials used.

Thus completed, the composite reinforcer of the invention is advantageously cooled, for example in air, so as to prevent problems of undesirable sticking while it is being wound onto the final take-up reel.

A person skilled in the art will know how to adjust the temperature and the duration of the treatment depending on the specific conditions for implementing the invention, in particular depending on the exact nature of the sheathed reinforcing element manufactured, in particular according to whether the treatment is carried out on monofilaments taken individually, cords composed of several monofilaments or groups of such monofilaments or cords, such as strips.

In particular, a person skilled in the art will have the advantage of scanning the treatment temperatures and times so as to search, by successive approximations, for the operating conditions leading to the best adhesion results, for each specific embodiment of the invention.

The stages of the process of the invention described above can advantageously be supplemented by a final treatment for three-dimensional crosslinking of the sheathed reinforcing element, in order to further reinforce its intrinsic cohesion, in particular in the cases where this composite reinforcer is intended for a subsequent use at a relatively high temperature, typically greater than 100° C. This crosslinking can be carried out by any known means, for example by physical crosslinking means, such as ion or electron bombardment, or by chemical crosslinking means, for example by introducing a crosslinking agent (e.g., linseed oil) into the composition, for example during its extrusion, or else by introducing, into the composition, a vulcanization (i.e., sulfur-based) system.

Crosslinking can also be obtained during the curing of the pneumatic tyres (or more generally rubber articles) which the composite reinforcer of use in the invention may be intended to reinforce, by means of the intrinsic crosslinking system present in the constituent diene rubber compositions of such tyres (or articles) and which comes into contact with the composite reinforcer of the invention.

Rubber Composition

As explained above, the sheathed thread or threads are embedded in a rubber composition. Rubber composition is understood to mean a composition comprising at least one elastomer, preferably a diene elastomer.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the rubber compositions of the reinforced product according to the invention is understood more particularly to mean:

(a) any homopolymer which can be obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene (or isoprene), 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type. These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the rubber composition is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds. In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to a specific preferred embodiment, the diene elastomer is a predominantly isoprene elastomer (that is to say, the fraction by weight of isoprene elastomer of which is the greatest, compared with the fraction by weight of the other elastomers). "Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/ butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%. Preferably, according to this embodiment, the content of isoprene diene elastomer is more than 50 phr (that is to say, from 50 to 100 phr), more preferably at least 60 phr (that is to say, from 60 to 100 phr), more preferably at least 70 phr (that is to say, from 70 to 100 phr), more preferably still at least 80 phr (that is to say, from 80 to 100 phr) and very preferably at least 90 phr (that is to say, from 90 to 100 phr). In particular, according to this embodiment, the content of isoprene diene elastomer is very preferably 100 phr.

More particularly, preferably, the diene elastomer of the rubber composition predominantly comprises an elastomer selected from the group consisting of natural rubber, synthetic polyisoprene and a mixture thereof.

Preferably, the rubber composition comprises from 60 to 100 phr, preferably from 70 to 100 phr, more preferably from 80 to 100 phr, better still from 90 to 100 phr, of an elastomer selected from the group consisting of natural rubber, synthetic polyisoprene and a mixture thereof.

The rubber composition used in the reinforced product advantageously comprises one or more reinforcing fillers.

Use may be made of any type of reinforcing filler known for its abilities to reinforce a rubber composition, for example an organic filler, such as carbon black, a reinforcing inorganic filler, such as silica, or else a blend of these two types of filler, in particular a blend of carbon black and of silica.

All carbon blacks, in particular blacks of the HAF, ISAF or SAF type, conventionally used in pneumatic tyres ("tyre-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of functionalized polyvinylaromatic organic fillers, such as described in Applications WO-A-2006/069792 and WO-A-2006/069793.

"Reinforcing inorganic filler" should be understood, in the present patent application, by definition, as meaning any inorganic or mineral filler, in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, especially silica ($SiO_2$), or of the aluminous type, especially alumina ($Al_2O_3$), are suitable in particular as reinforcing inorganic fillers.

Preferably, the reinforcing filler or fillers are selected from silica, carbon black and their mixture, and more preferably the reinforcing filler is carbon black.

Preferably, the reinforcing filler or fillers (carbon black and/or reinforcing inorganic filler, such as silica) are present at a content ranging from 20 to 200 phr, preferably from 30 to 150 phr, more preferably from 40 to 80 phr.

According to one embodiment of the invention, use is made of a reinforcing filler comprising between 30 and 150 phr, more preferably between 30 and 120 phr, of organic filler, particularly carbon black.

When the reinforcing filler comprises a filler requiring the use of a coupling agent in order to establish the bond between the filler and the diene elastomer, the rubber composition in addition conventionally comprises an agent capable of effectively providing this bond. When silica is present in the rubber composition as reinforcing filler, use is made, in a known way, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides referred to as "symmetrical", corresponding to the following general formula (I):

$$Z\text{-}A\text{-}S_x\text{-}A\text{-}Z \qquad (I)$$

in which:
x is an integer from 2 to 8, preferably from 2 to 5;
A is a divalent hydrocarbon radical, preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene;
Z corresponds to one of the formulae below:

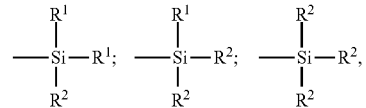

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group, preferably represent $C_1$-$C_6$ alkyl, cyclohexyl or phenyl groups, in particular $C_1$-$C_4$ alkyl groups, and more particularly represent methyl and/or ethyl,
the $R^2$ radicals, which are substituted or unsubstituted and identical to or different from one another, represent a $C_1$-$C_{18}$ alkoxyl or $C_5$-$C_{18}$ cycloalkoxyl group, preferably represent a group chosen from $C_1$-$C_8$ alkoxyls and $C_5$-$C_8$ cycloalkoxyls, more preferably still represent a group chosen from $C_1$-$C_4$ alkoxyls and in particular represent a methoxyl and ethoxyl group.

In the case of a mixture of alkoxysilane polysulfides corresponding to the above formula (I), in particular normal commercially available mixtures, the mean value of the "x" indices is a fractional number preferably ranging from 2 to 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880).

Mention will in particular be made, as coupling agent other than alkoxysilane polysulfide, of bifunctional POSs (polyorganosiloxanes), or else of hydroxysilane polysulfides (R2=OH in the above formula I), such as described, for example, in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber composition used in the reinforced product according to the invention, the content of coupling agent preferably varies from 0.5 to 12 phr, it being understood that it is in general desirable to use as little as possible of it. The presence of the coupling agent depends on the presence of the reinforcing inorganic filler other than carbon black. Its content is easily adjusted by a person skilled in the art according to the content of this filler; it is typically of the order of 0.5% to 15% by weight, with respect to the amount of reinforcing inorganic filler other than carbon black.

A person skilled in the art will understand that, as filler equivalent to the reinforcing inorganic filler other than carbon black, use might be made of a reinforcing filler of another nature, provided that this reinforcing filler is covered with an inorganic layer, such as silica, or else comprises functional sites, in particular hydroxyl sites, at its surface which require the use of a coupling agent in order to form the bond between the filler and the diene elastomers.

The composition used in the reinforced product according to the invention advantageously comprises a crosslinking system.

The crosslinking system can be a vulcanization system. In this case, it is preferably based on sulfur or based on a sulfur donor and on a primary vulcanization accelerator.

Mention may be made, among sulfur donors, for example, of alkylphenol disulfides (APDSs), such as, for example, para-(tert-butyl)phenol disulfide.

The sulfur is used at a preferred content ranging from 0.5 to 10 phr, more preferably ranging from 0.5 to 5 phr, in particular from 0.5 to 3 phr.

Use may be made, as primary accelerator, of any compound capable of acting as accelerator for the vulcanization of diene elastomers in the presence of sulfur, in particular accelerators of the thiazole type, and also their derivatives, or accelerators of thiuram or zinc dithiocarbamate type.

These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds.

Preferably, use is made of a primary accelerator of the sulfenamide type.

Additional to this base vulcanization system are optionally various known secondary vulcanization accelerators or vulcanization activators, such as zinc oxide, stearic acid or equivalent compounds, or guanidine derivatives (in particular diphenylguanidine).

The content of each primary or secondary vulcanization accelerator and of each vulcanization activator generally varies from 0.5 to 5.0 phr.

The rubber composition of the reinforced product according to the invention optionally also comprises all or a portion of the normal additives generally used in elastomer compositions intended in particular for the manufacture of pneumatic tyres, such as, for example, pigments, protective agents, such as antiozone waxes, chemical antiozonants or antioxidants, plasticizing agents, such as plasticizing oils or hydrocarbon resins well known to a person skilled in the art, reinforcing resins, or methylene acceptors (for example novolak phenolic resin) or donors (for example HMT or H3M).

Commonly, the rubber compositions also comprise an adhesion promoter, for example a cobalt salt. This is because the composition is used in the manufacture of semi-finished products intended to be in contact with one or more metallic reinforcing elements, for example metal cords. The cobalt salt makes possible durable adhesion of the composition to the metal cords, in particular to their coating comprising, for example, brass. However, such cobalt salts are relatively expensive. Furthermore, it is desirable to limit as much as possible the amount to be employed of these salts in order to reduce their environmental impact. In the rubber composition of the reinforced product of the invention, preferably no cobalt salt and preferably no adhesion promoter are used.

It is obvious that the invention relates to the reinforced products, the rubber composition of which is in the "raw" or non-crosslinked state (i.e., before curing) or in the "cured" or crosslinked, or also vulcanized, state (i.e., after crosslinking or vulcanization).

The rubber compositions are manufactured in appropriate mixers, using, for example, two successive phases of preparation according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at lower temperature, typically below 120° C., for example between 60° C. and 100° C., during which finishing phase the vulcanization system is incorporated.

A process which can be used for the manufacture of such rubber compositions comprises, for example and preferably, the following stages:

incorporating the reinforcing filler and the optional other ingredients of the composition, with the exception of the crosslinking system, in the diene elastomer or in the said diene elastomers in a mixer, everything being kneaded thermomechanically, in one or more goes, until a maximum temperature of between 130° C. and 200° C. is reached;

cooling the combined mixture to a temperature of less than 100° C.;

subsequently incorporating the crosslinking system;

kneading everything up to a maximum temperature of less than 120° C.;

extruding or calendering the rubber composition thus obtained.

By way of example, the first (non-productive) phase is carried out in a single thermomechanical stage during which all the necessary constituents, the optional supplementary covering agents or processing aids and various other additives, with the exception of the crosslinking system, are introduced into an appropriate mixer, such as an ordinary internal mixer. After cooling the mixture thus obtained during the first non-productive phase, the crosslinking system is then incorporated at low temperature, generally in an external mixer, such as an open mill; everything is then mixed (productive phase) for a few minutes, for example between 5 and 15 min.

The final composition thus obtained is subsequently calendered, for example in the form of a sheet or of a plaque, in particular for laboratory characterization, or else calendered or extruded in the form of a sheet or of a rubber profiled element which can be used directly as coating rubber for a sheathed reinforcer, that is to say for one (or more) metallic or textile reinforcing thread(s), the said thread or threads being covered in a sheath, as described above.

The crosslinking, preferably the vulcanization (or curing), is carried out in a known way at a temperature generally of between 130° C. and 200° C., for a sufficient time which can vary, for example, between 5 and 90 min, as a function in particular of the curing temperature, of the vulcanization system adopted and of the kinetics of vulcanization of the composition under consideration.

Figure 1:
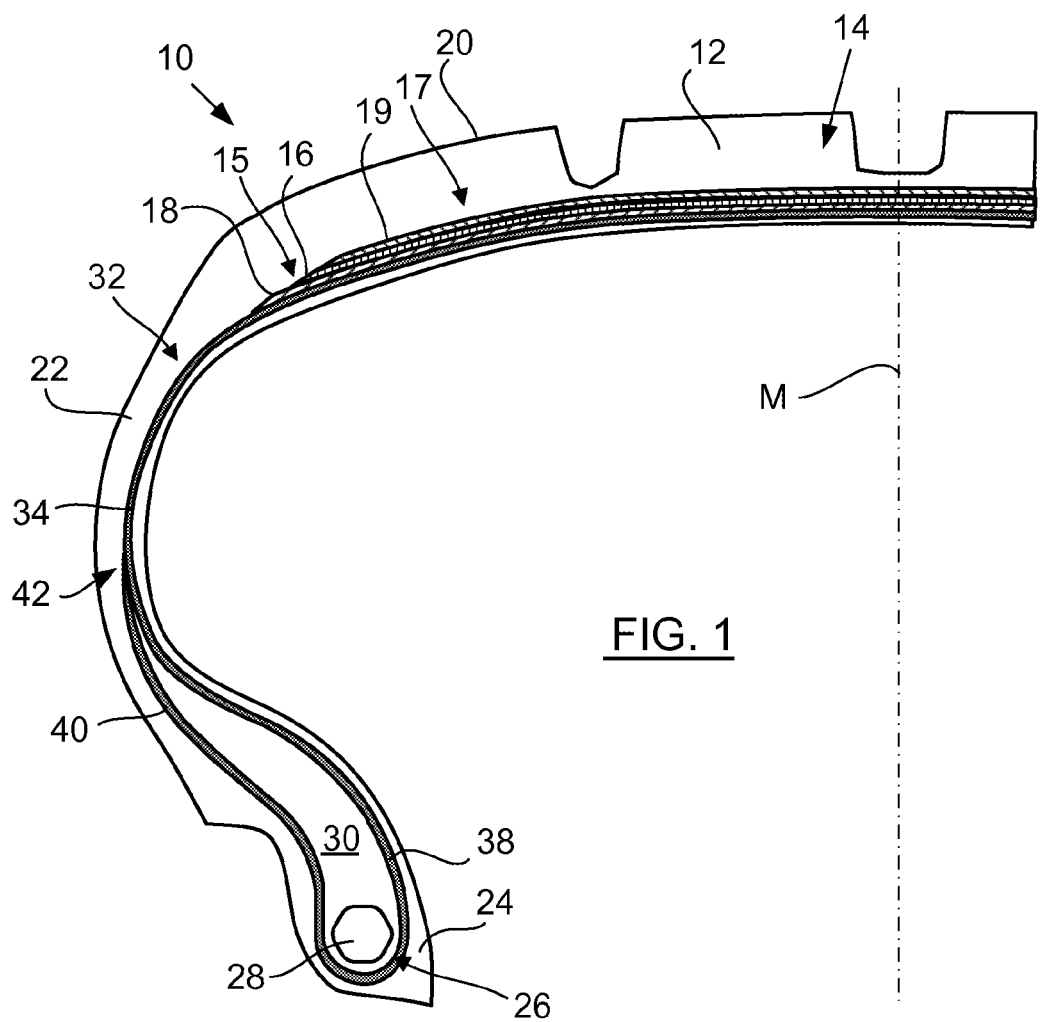

The appended FIG. 1 represents a pneumatic tyre in accordance with a first embodiment of the invention and denoted by the general reference 10. The pneumatic tyre 10 is substantially of revolution around an axis substantially parallel to the axial direction of the pneumatic tyre. The pneumatic tyre 10 is in this instance intended for a passenger vehicle or a heavy-duty vehicle, such as a lorry.

The median plane M of the pneumatic tyre is the plane which is normal to the axis of rotation of the pneumatic tyre and which is located equidistantly from the annular reinforcing structures of each bead.

The circumferential direction is the direction which is perpendicular both to a radius of the pneumatic tyre and to the axial direction.

The pneumatic tyre 10 comprises a crown 12 comprising a crown reinforcement 14 comprising a working reinforcement 15 comprising two working plies 16, 18 and a hooping reinforcement 17 comprising a hooping ply 19. The crown reinforcement 14 is surmounted by a tread 20. The hooping reinforcement 17, in this instance the hooping ply 19, is radially interposed between the working reinforcement 15 and the tread 20.

Two sidewalls 22 extend the crown 12 radially inwards. The pneumatic tyre 10 additionally comprises two beads 24 radially interior to the sidewalls 22 and each comprising an annular reinforcing structure 26, in this case a bead wire 28, surmounted by a mass of filling rubber 30, and also a radial carcass reinforcement 32. The crown reinforcement 14 is radially interposed between the carcass reinforcement 32 and the tread 20. Each sidewall 22 connects each bead 24 to the crown 14.

The carcass reinforcement 32 preferably comprises just one carcass ply 34 of radial textile reinforcing elements. The carcass reinforcement 32 is anchored to each of the beads 24 by a turn-up around the bead wire 28, so as to form, in each bead 24, an outward strand 38 extending from the beads 24 through the sidewalls 22 as far as into the crown 12, and a return strand 40, the radially outer end 42 of the return strand 40 being radially on the outside of the annular reinforcing structure 26. The carcass reinforcement 32 thus extends from the beads 24 through the sidewalls 22 as far as into the crown 12. In this embodiment, the carcass reinforcement 32 also extends axially through the crown 12.

Each working ply 16, 18 forms a reinforced product 21 according to the invention comprising reinforcing elements 44 forming an angle ranging from 15° and 40°, preferably ranging from 20° to 30° and in this instance equal to 26° with the circumferential direction of the pneumatic tyre 10. The reinforcing elements 44 are crossed from one working ply to the other. On this account, each working ply 16, 18 comprises a specific sheathing composition of the invention, that is to say a composition as defined above and below for the requirements of the invention.

The hooping ply 19 comprises hooping textile reinforcing elements which form an angle at most equal to 10°, preferably ranging from 5° to 10°, with the circumferential direction of the pneumatic tyre 10. In the case in point, the hooping textile reinforcing elements are folded yarns produced in a heat-shrinkable material, in this case made of polyamide 66, each folded yarn consisting of two spun yarns of 140 tex which have been twisted together (on a direct cabling machine) at 250 turns/metre, the diameter of which is equal to approximately 0.66 mm. The thermal contraction TC of each hooping textile reinforcing element is equal to approximately 7%.

The working plies 16, 18, hooping ply 19 and carcass ply 34 comprise an elastomer matrix in which the reinforcing elements of the corresponding ply are embedded. The rubber compositions of the elastomer matrices of the working plies 16, 18, hooping ply 19 and carcass ply 34 may be conventional compositions for the calendering of reinforcing elements conventionally comprising a diene elastomer, for example natural rubber, a reinforcing filler, for example carbon black and/or silica, a crosslinking system, for example a vulcanization system, preferably comprising sulfur, stearic acid and zinc oxide, and possibly a vulcanization accelerator and/or retarder and/or various additives.

FIGS. 2 to 5 represent various embodiments of the invention, that is to say various arrangements of reinforced products 21 according to the invention. The reinforcing elements 44 of the reinforced product 21 are arranged side by side along a main direction. The reinforcing elements 44 extend parallel to one another. Each reinforcing element 44 comprises at least one reinforcing thread 46. Each reinforcing element 44 also comprises at least one sheath 48 coating the reinforcing thread 46 and comprising at least one layer 50 of a composition of the block copolymer. The sheathed reinforcer 44 is embedded in a rubber composition 23.

The sheath 48 comprises a single layer 50 of the block copolymer composition.

Each reinforced product of FIGS. 2 to 5 comprises three sheathed reinforcing elements 44 embedded together in the rubber composition 23.

The difference between the embodiments presented in FIGS. 2 to 5 lies in the arrangement and the number of reinforcing threads 46 in the sheath in order to form the sheathed reinforcing element 44, in this instance the sheathed metallic reinforcing element, of use to the reinforced product 21 of the invention.

Thus, in FIG. 2, each sheathed reinforcing element 44 comprises a reinforcing thread 46 comprising a single monofilament, in this instance a metallic monofilament, individually covered with a sheath 48.

In FIG. 3, each sheathed reinforcing element 44 comprises a reinforcing thread 46 comprising three monofilaments, in this instance metallic monofilaments, cabled together, each reinforcing thread 46 being individually covered with a sheath 48.

In FIG. 4, each sheathed reinforcing element 44 forms a strip comprising three reinforcing threads 46 collectively covered with one and the same sheath 48.

In FIG. 5, each sheathed reinforcing element 44 forms a strip of three reinforcing threads 46, each reinforcing thread 46 comprising three monofilaments, in this instance metallic monofilaments, cabled together. The three reinforcing threads 46 are collectively covered with one and the same sheath 48.

The reinforced product of the invention described above can be used in particular for the manufacture of any finished rubber article or semi-finished rubber product, especially for reinforcing pneumatic or non-pneumatic tyres of all vehicle types, especially passenger vehicles or industrial vehicles, such as heavy-duty vehicles.

As already indicated above, this reinforced product of the invention can be provided in varied forms, in a unitary form (with a single reinforcing thread) or else in the form of a rubber ply, belt, strip or block in which several textile and/or metallic reinforcing threads are incorporated, for example by calendering. The definitive adhesion between the sheathed threadlike reinforcer and the coating rubber may be obtained on conclusion of the curing, preferably under pressure, of the finished article for which the threadlike reinforcer is intended.

Another subject-matter of the invention is thus a tyre comprising a reinforced product according to the invention. Tyre is understood to mean an object of toroidal general shape. More specifically, a structure of revolution around a main axis, this structure defining a closed surface, is meant.

According to one embodiment, the tyre is pneumatic and intended to delimit at least in part a cavity subjected to an inflation pressure of a gas.

According to another embodiment, the tyre is non-pneumatic and intended to form a belt carried by a support.

Preferably, the tyre is a tyre for a vehicle and more preferably a pneumatic tyre for a vehicle.

The following examples serve to illustrate the invention without, however, exhibiting a limiting nature.

EXAMPLES

I. Synthesis of the Block Copolymers

Synthesis of the Copolymer: PA 1 According to the Invention

The mixing of polybutadiene and of fatty acid dimer in a molar ratio of ½ (polybutadiene/fatty acid dimer) is carried out.

The mixture obtained is then mixed with the polyamide as described below.

Manufacture of PA 11 Diamine with a Number-Average Molecular Weight of 5000 g/Mol:

5000 g of 11-aminoundecanoic acid, 116.2 g of hexamethylenediamine and 750 g of deionized water are introduced into a 12 l autoclave equipped with a stirrer of anchor type. The medium is rendered inert with nitrogen and then heated up to a material temperature of 210° C. with stirring. The pressure is then 20 bar. The medium is then heated to a material temperature of 230° C. while maintaining a pressure of 20 bar. When this temperature is reached, the pressure is brought back to atmospheric pressure by reducing in pressure and flushing under nitrogen is applied for 90 minutes.

The product obtained is thus emptied into liquid nitrogen and recovered in the form of blocks.

The chain ends are quantitatively determined by potentiometry:

$NH_2$=0.399 meq/g

The molecular weight is indeed 5000 g/mol.

Manufacture of a Pentablock:

761.9 g of Krasol® LBH-P 2000 (viscosity 13 000 cP, Mn=2100, 0.36 mol), 438.1 g of Pripol® 1013 (M=575 g/mol, 0.76 mol), 1.2 g of Irganox® 1098 and 1.2 g of phosphoric acid are introduced into a 12 l autoclave equipped with a stirrer of anchor type. The medium is stirred and is brought to a temperature of 235° C. under vacuum for 3 h. The medium is brought back to atmospheric pressure. 3800 g (0.76 mol) of the polyamide prepared above are added and the reaction takes place under vacuum at 235° C. for 90 min.

The product is subsequently emptied into water and granulated.

Potentiometric titration of the chain ends is:

$NH_2$=0.18 meq/g

Potentiometric Titration of the Amine Chain Ends:

500 mg of polymer are dissolved in 80 g of m-cresol at 130° C. for 1 h.

0.02N perchloric acid (in acetic acid) is added until the amine chain ends have been neutralized. This neutralization is accompanied by a modification of potential, monitored using electrodes.

II. Preparation of the Extruded Part

A reinforcing thread with a diameter of approximately 0.35 mm, for example a metal cord composed simply of three individual monofilaments with a diameter of 0.18 mm twisted together, is covered with a first layer of a block copolymer with a maximum thickness equal to approximately 0.25 mm at the diameter, in order to obtain a sheathed reinforcing thread having a total diameter of approximately 0.6 mm, on an extrusion/sheathing line comprising two dies, a first die (counter-die or upstream die) with a diameter equal to approximately 0.41 mm and a second die (or downstream die) with a diameter equal to approximately 0.53 mm, both dies being positioned in an extrusion head brought to approximately 210° C.

The block copolymer, molten at a temperature of 210° C. to 230° C. according to the heating zones of the extrusion die (Z1=210° C., Z2=220° C., Z3=230° C., Collar=220° C.) in the extruder, thus covers the reinforcing thread, via the sheathing head, at a rate of forward progression of the thread typically equal to several tens of m/min, for an extrusion pump throughput typically of several tens of cm³/min. On exiting from this sheathing operation, the thread can be immersed in a cooling tank filled with cold water, in order to solidify and set the polyamide in its amorphous state, and then dried, for example by passing the take-up reel into the oven.

III. Tests and Results

Description of the Adhesion Test:

The quality of the bond between the rubber and the sheathed reinforcing elements manufactured above is subsequently assessed by a test in which the force needed to extract the sheathed reinforcing elements from a vulcanized rubber composition, also known as vulcanizate, is measured. This rubber composition is a conventional composition used for the calendering of pneumatic tyre belt metal plies, based on natural rubber, carbon black and standard additives.

Rubber Composition Used:

The rubber composition comprises 100 phr of natural rubber, 70 phr of series 300 carbon black, 1.5 phr of N-(1,3-dimethylbutyl)-N'-phenyl-para-phenylenediamine, 1 phr of a cobalt salt, 0.9 phr of stearic acid, 6 phr of insoluble molecular sulfur, 0.8 phr of N-(tert-butyl)-2-benzothiazole-sulfamide and 7.5 phr of ZnO.

The vulcanizate is a rubber block composed of two sheets having dimensions of 200 mm by 4.5 mm and having a thickness of 3.5 mm, applied against each other before curing (the thickness of the resulting block is then 7 mm). It is during the production of this block that the sheathed reinforcing elements (15 strands in total) are trapped between the two rubber sheets in the raw state, an equal distance apart and while leaving to protrude, on either side of these sheets, a sheathed reinforcing element end having a length sufficient for the subsequent tensile test. The block comprising the reinforcing elements is then placed in a suitable mould and then cured under pressure. The curing of the block is carried out at 160° C. for 15 min, under a pressure of 16 bar.

On conclusion of the curing, the test specimen, thus consisting of the vulcanized block and the 15 reinforcers, is placed between the jaws of a suitable tensile testing machine in order to make it possible to pull each sheathed reinforcing element individually out of the rubber, at a given rate and a given temperature: at 50 mm/min and 20° C.

The adhesion levels are characterized by measuring the "pull-out" force (denoted Fmax) for pulling the reinforcing elements out of the test specimen (average over 15 tensile tests).

The block copolymer is compared with a homopolyamide of PA 6.6 structure, obtained by polycondensation of a hexanediamine and adipic acid.

1/ Tensile Test at 23° C.

TABLE 1

| | Faver (N/mm$^2$) | Fmax (N/mm$^2$) |
|---|---|---|
| PA 66 (comparative) | 1.1 | 2.1 |
| Block PA 1 according to the invention | 14.2 | 15.6 |

2/ Tensile Test at 100° C.

TABLE 2

| | Faver (N/mm$^2$) | Fmax (N/mm$^2$) |
|---|---|---|
| Block PA 1 according to the invention | 5.8 | 6.6 |

3/ Tensile Test at 120° C.

TABLE 3

| | Faver (N/mm$^2$) | Fmax (N/mm$^2$) |
|---|---|---|
| PA 66 | 0.3 | 0.5 |

IV. Conclusion

These results show that the reinforced product including the block copolymer of use according to the invention makes it possible to obtain an adhesion, whether at ambient temperature or at higher temperature, which is improved with respect to the reinforced product including a homopolyamide of PA 66 structure. The adhesion obtained is more than 10 times greater than that obtained with the PA 66 conventionally used.

The invention claimed is:

1. A reinforced product comprising one or more reinforcing threads,
   wherein the thread or threads are covered individually or collectively with a sheath comprising a sheathing composition comprising one or more block copolymers comprising at least one polyamide block, at least one polyolefin block, and at least one alkylene block, and
   wherein the sheathed thread or threads are embedded in a rubber composition,
   wherein the one or more block copolymers have the following formula:

PA-(R-Pol-PA)n-R-Pol-R-PA, and wherein n is between 0 and 100, PA denotes the polyamide block or blocks, R denotes the alkylene block or blocks, and Pol denotes the polyolefin block or blocks.

2. The reinforced product according to claim 1, wherein the polyolefin block or blocks each exhibit a viscosity of less than 60,000 cPs, the viscosity being measured at 25° C. with a Brookfield device and according to the Brookfield method.

3. The reinforced product according to claim 2, wherein the polyolefin block or blocks each exhibit a viscosity of less than 40,000 cPs.

4. The reinforced product according to claim 3, wherein the polyolefin block or blocks each exhibit a viscosity of less than 20,000 cPs.

5. The reinforced product according to claim 4, wherein the polyolefin block or blocks each exhibit a viscosity of between 1000 and 20,000 cPs.

6. The reinforced product according to claim 2, wherein the polyolefin block or blocks are a polybutadiene block or blocks.

7. The reinforced product according to claim 1, wherein the polyamide block or blocks comprise at least one unit selected from the group consisting of PA 6, PA 11, PA 12, PA 6.10, PA 6.6, PA 6.12, PA 10.10, PA 10.12, PA 11/10.T, PA 11/6.T, 12/10.T, 6.10/10.T, 6.12/10.T, 10.10/10.T, 10.12/10.T, 11/6.T/10.T, 12.12/10.T, 12/6.10/10.T, 12/6.12/10.T, 12/10.10/10.T, 12/10.12/10.T and 12/12.12/10.T.

8. The reinforced product according to claim 1, wherein the polyamide block or blocks each exhibit a number-average molecular weight, measured by potentiometry, of between 600 and 20,000 g/mol.

9. The reinforced product according to claim 8, wherein the polyamide block or blocks each exhibit a number-average molecular weight, measured by potentiometry, of between 4,000 and 10,000 g/mol.

10. The reinforced product according to claim 1, wherein the block copolymer comprises a content of polyolefin block between 2% and 98% by weight with respect to a total weight of the block copolymer.

11. The reinforced product according to claim 10, wherein the block copolymer comprises a content of polyolefin block between 5% and 70% by weight with respect to a total weight of the block copolymer.

12. The reinforced product according to claim 11, wherein the block copolymer comprises a content of polyolefin block between 6% and 50% by weight with respect to a total weight of the block copolymer.

13. The reinforced product according to claim 12, wherein the block copolymer comprises a content of polyolefin block between 8% and 30% by weight with respect to a total weight of the block copolymer.

14. The reinforced product according to claim 13, wherein the block copolymer comprises a content of polyolefin block between 9% and 25% by weight with respect to a total weight of the block copolymer.

15. The reinforced product according to claim 1, wherein the block copolymer or block copolymers further comprise at least one chain-extending block.

16. The reinforced product according to claim 1, wherein the at least one alkylene block is a fatty acid dimer.

17. The reinforced product according to claim 16, wherein the fatty acid dimer is a C2-C36 fatty acid dimer.

18. The reinforced product according to claim 17, wherein the fatty acid dimer is a C8-C36 fatty acid dimer.

19. The reinforced product according to claim 1, wherein the block copolymer or block copolymers comprise:
   at least one polybutadiene block as the polyolefin block or blocks, and
   at least one C2-C36 diacid alkylene block.

20. The reinforced product according to claim 19, wherein the block copolymer or block copolymers comprise:
   at least one polybutadiene block as the polyolefin block or blocks, and
   at least one C8-C36 diacid alkylene block.

21. The reinforced product according to claim 1, wherein the rubber composition further comprises a reinforcing filler.

22. The reinforced product according to claim 1, wherein the rubber composition further comprises a crosslinking system.

23. The reinforced product according to claim 22, wherein the reinforcing thread or threads are metallic.

24. A tire comprising a reinforced product according to claim 1.

* * * * *